US010158695B1

(12) United States Patent
Mendel et al.

(10) Patent No.: US 10,158,695 B1
(45) Date of Patent: Dec. 18, 2018

(54) SYSTEM AND METHOD FOR POLLING VIA PROXIMAL AWARENESS

(71) Applicant: KOGM, Inc., Washington, DC (US)

(72) Inventors: Gary W. Mendel, Washington, DC (US); Kevin Ostrowski, New York, NY (US)

(73) Assignee: KOGM, Inc., Washington, DC (US)

(*) Notice: Subject to any disclaimer, the term of this patent is extended or adjusted under 35 U.S.C. 154(b) by 89 days.

(21) Appl. No.: 15/012,272

(22) Filed: Feb. 1, 2016

Related U.S. Application Data

(60) Provisional application No. 62/109,781, filed on Jan. 30, 2015.

(51) Int. Cl.
G06F 15/16 (2006.01)
H04M 11/00 (2006.01)
H04L 29/08 (2006.01)
H04W 84/12 (2009.01)

(52) U.S. Cl.
CPC .............. H04L 67/06 (2013.01); H04L 67/10 (2013.01); H04W 84/12 (2013.01)

(58) Field of Classification Search
CPC ............... H04L 29/08072; H04L 29/06; H04L 29/0809; H04L 29/08117; G06Q 30/02; H04N 21/4532; H04N 7/163; H04N 21/4542; H04N 21/4755; H04N 21/454

USPC ........................................................ 709/219
See application file for complete search history.

(56) References Cited

U.S. PATENT DOCUMENTS

| | | | |
|---|---|---|---|
| 7,490,348 B1* | 2/2009 | Harris ................. | H04L 63/0428 713/153 |
| 8,090,872 B2* | 1/2012 | Pilu ................... | G06F 17/30905 709/235 |
| 2005/0259291 A1* | 11/2005 | Kii ....................... | G06Q 10/107 358/1.15 |
| 2007/0226628 A1* | 9/2007 | Schlack ................ | G06Q 10/10 715/733 |
| 2014/0317242 A1* | 10/2014 | Koo ...................... | H04W 12/04 709/219 |
| 2016/0021414 A1* | 1/2016 | Padi ................... | H04N 21/4122 725/28 |

* cited by examiner

Primary Examiner — Mahran Abu Roumi

(57) ABSTRACT

The present disclosure is directed to a system and a method for generating a poll based upon proximal awareness of one client device to another client device. In one or more implementations, the present disclosure discloses receiving, at a server, digital content data from a first client device in communication with the server via at least one local area wireless signal. The present disclosure also discloses pairing the digital content data with the at least one local area wireless signal. The present disclosure also discloses transmitting the digital content data to a second client device when the second client device detects the at least one local area wireless signal.

11 Claims, 36 Drawing Sheets

FIG.1 – Network and System (client/Server) Topology:
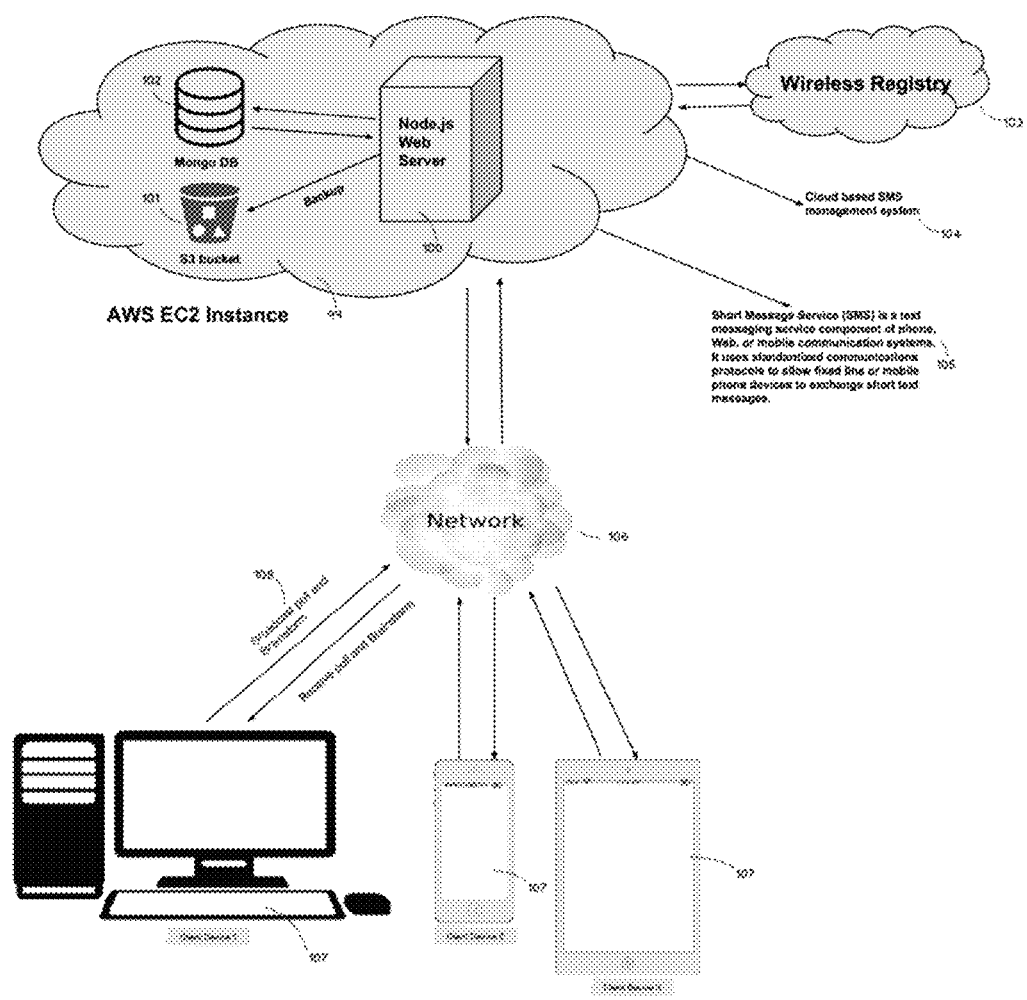

FIG.2 - Polling via proximal awareness via Wi-Fi signal:
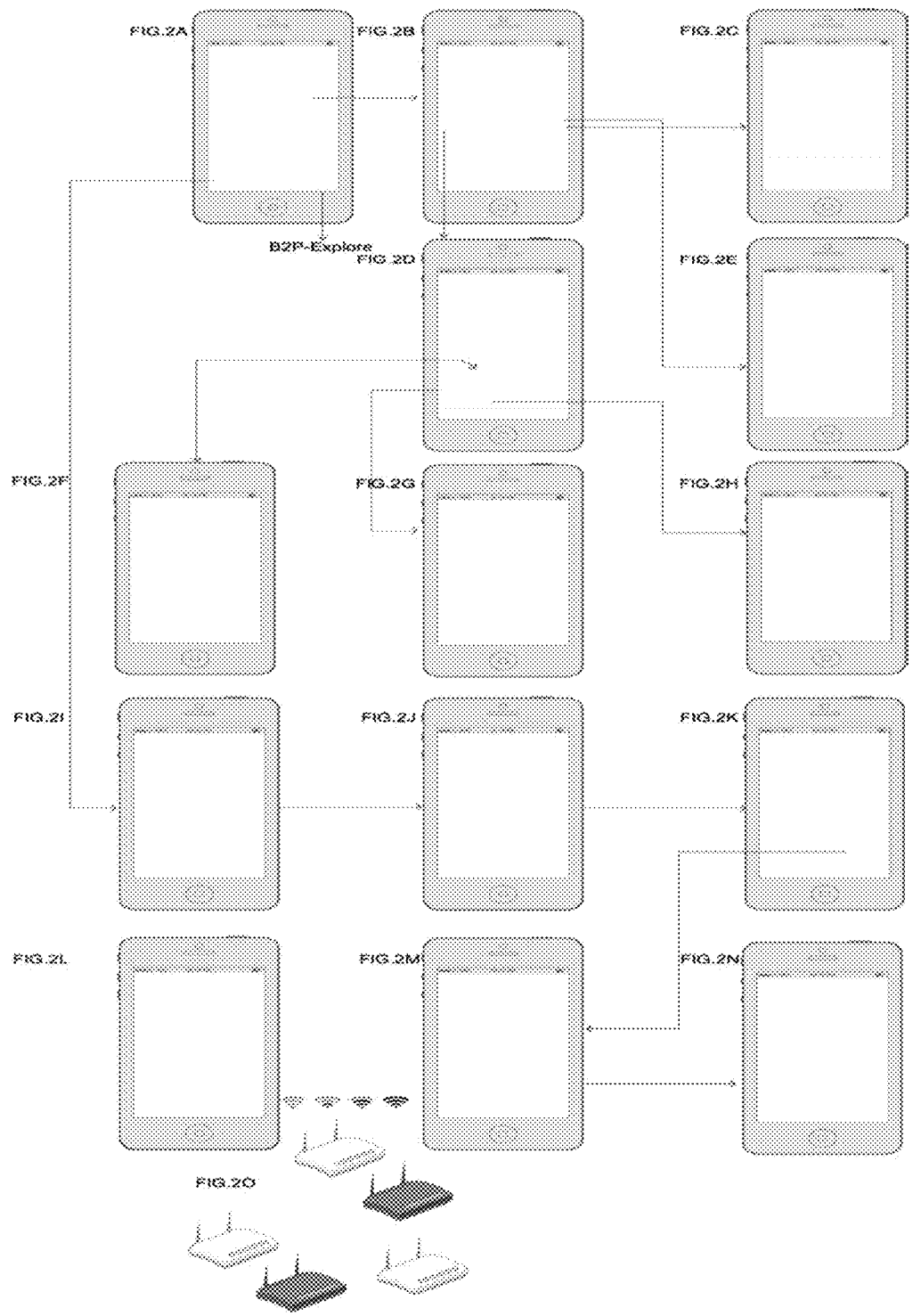

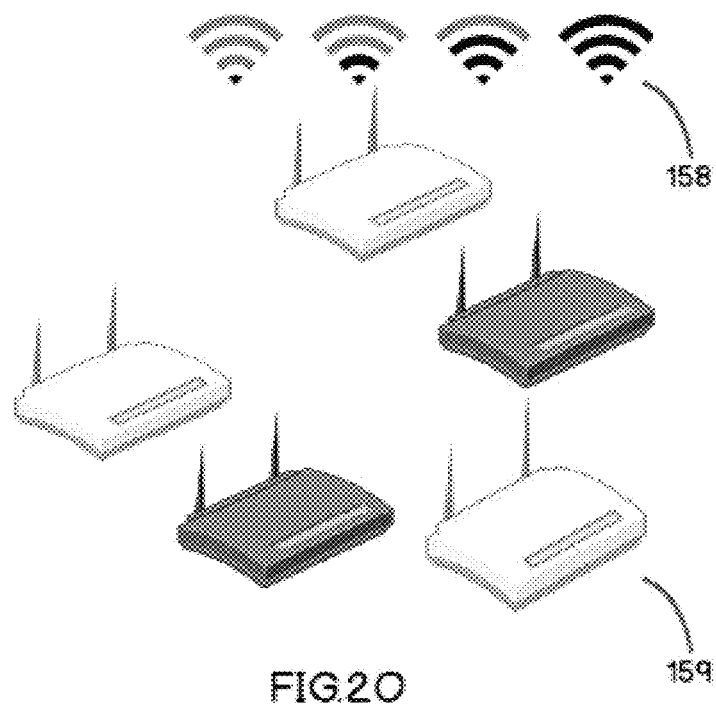
FIG.2O
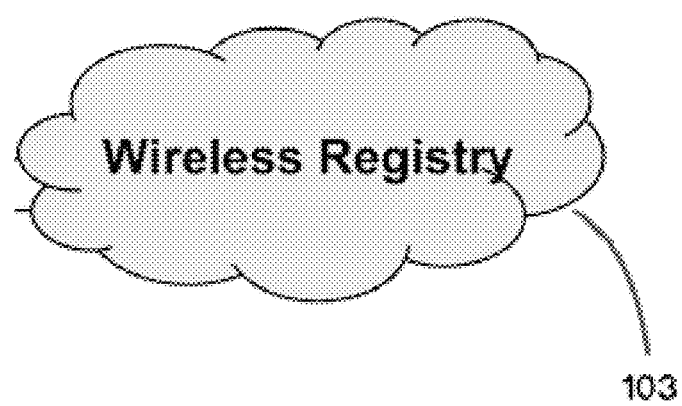
FIG2.P

FIG.3 - Polling via GPS and geo-fencing:
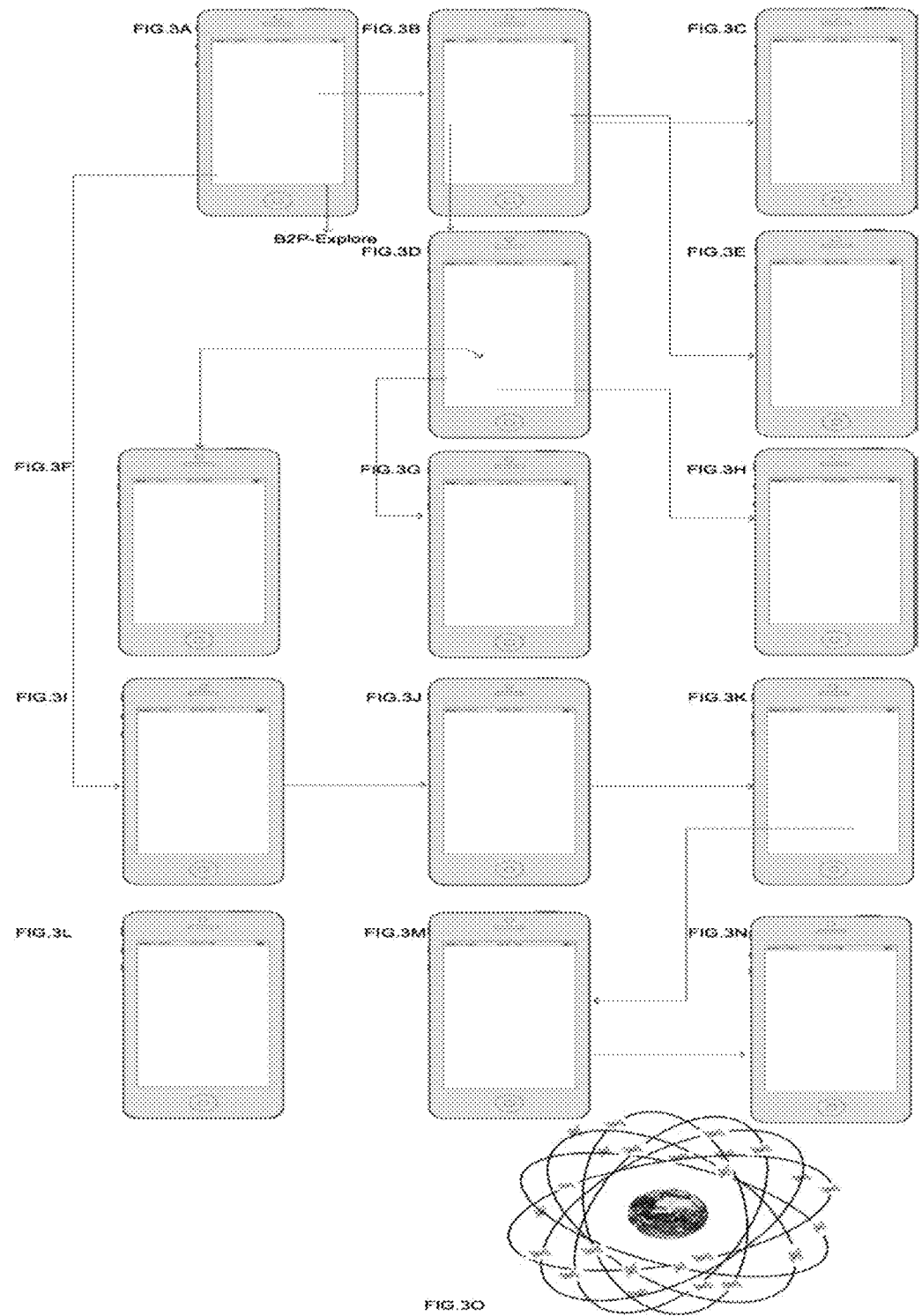

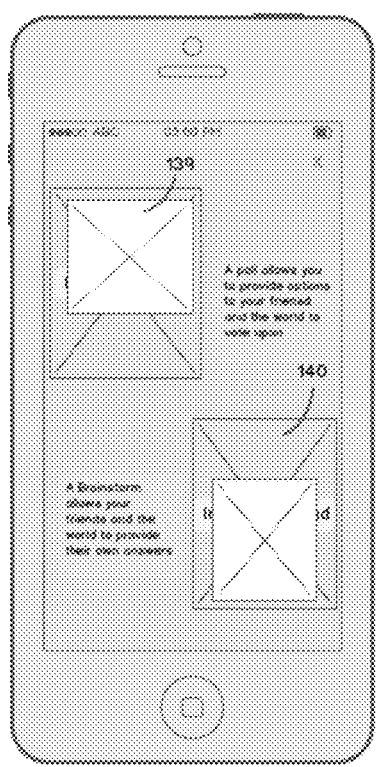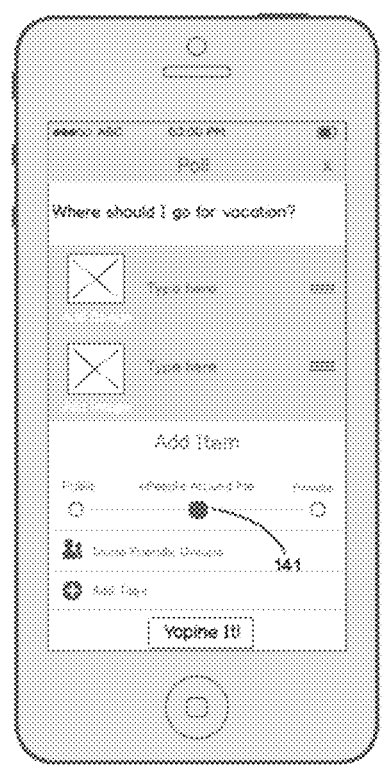
FIG.3E                    FIG.3F

FIG.4 - Creating an electronic poll out of an electronic brainstorming session:

FIG.5 - Group polling via cross contact sources (Facebook, Twitter, phone contacts):
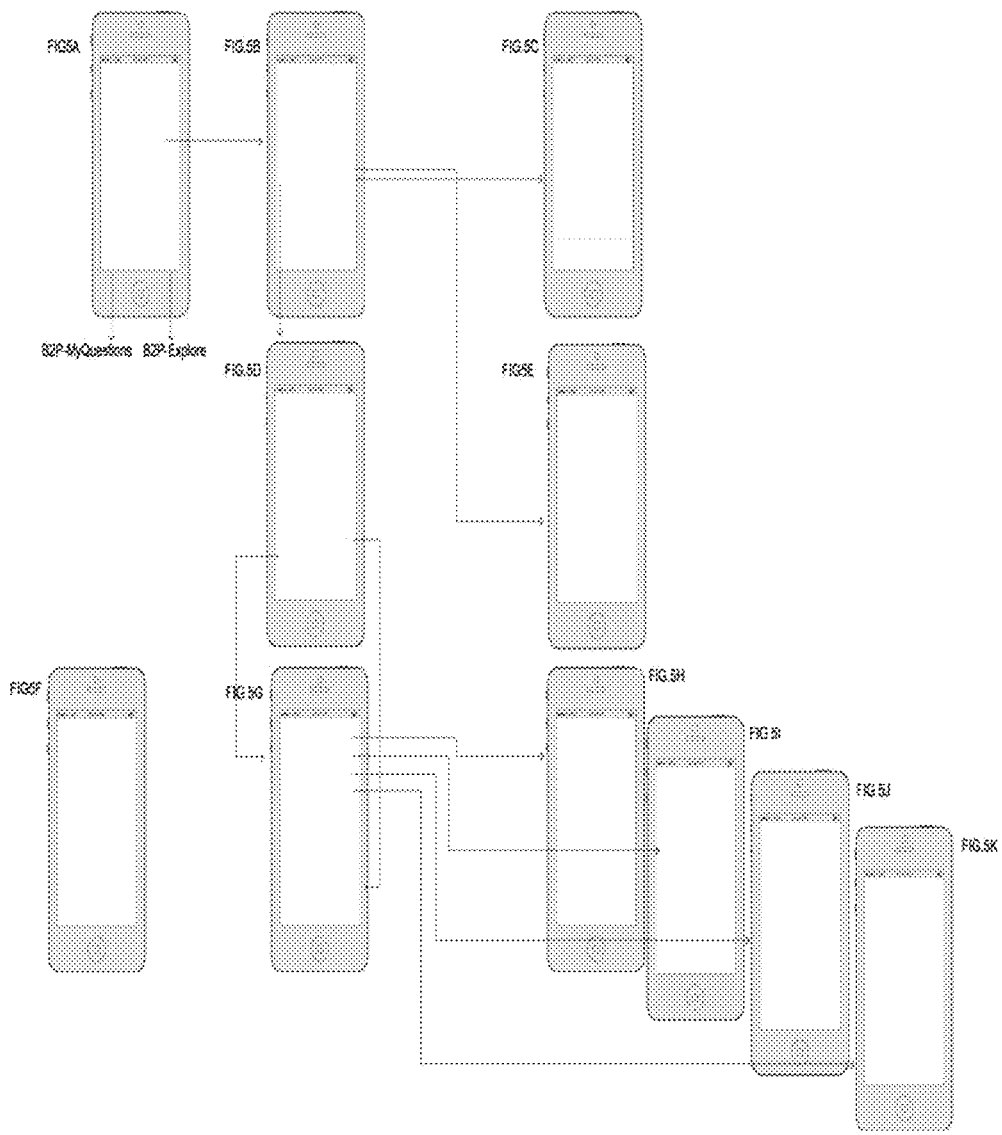

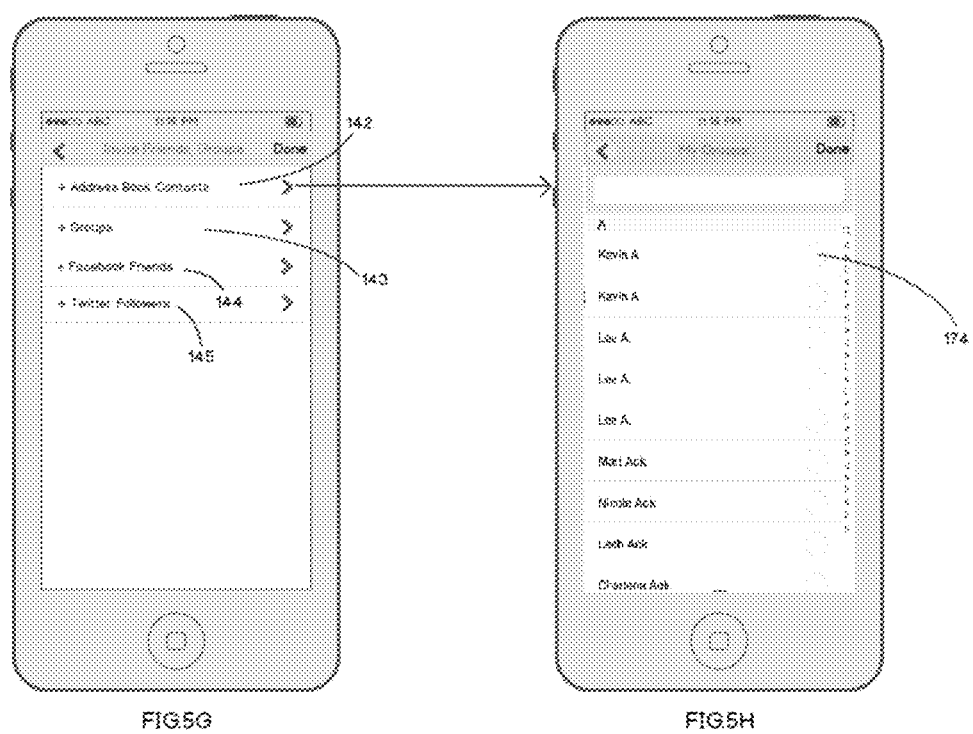

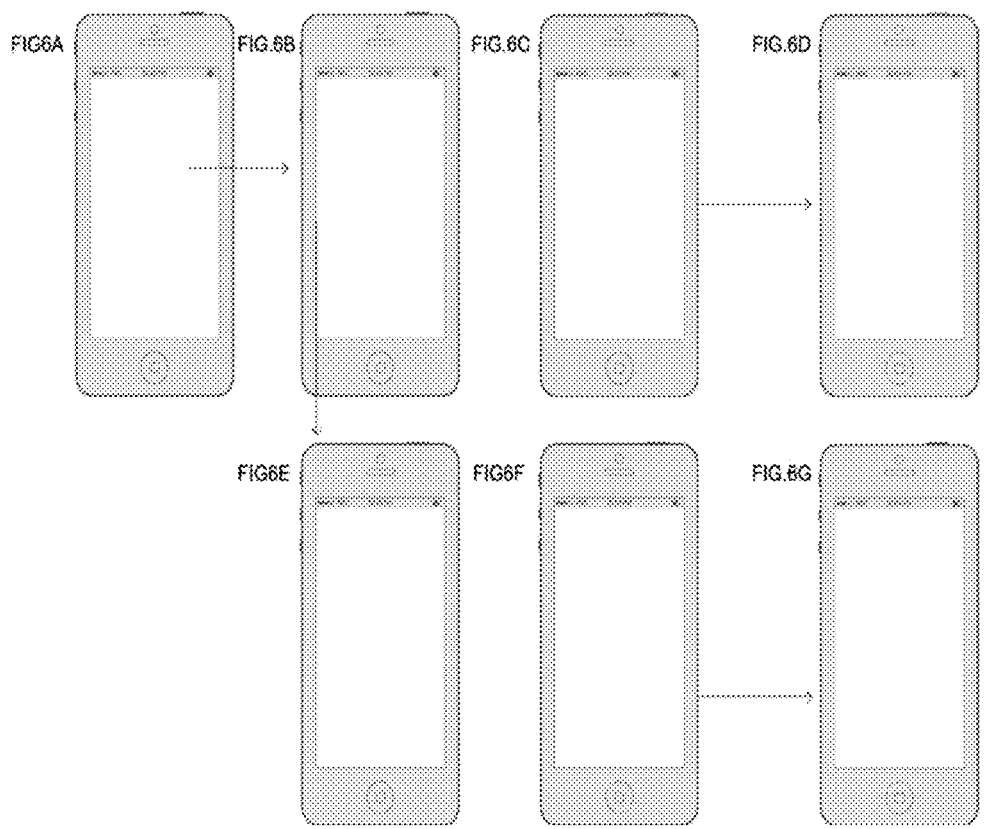
FIG.6 - Sponsored keywords as defined by poll creators as a marketing tactic:

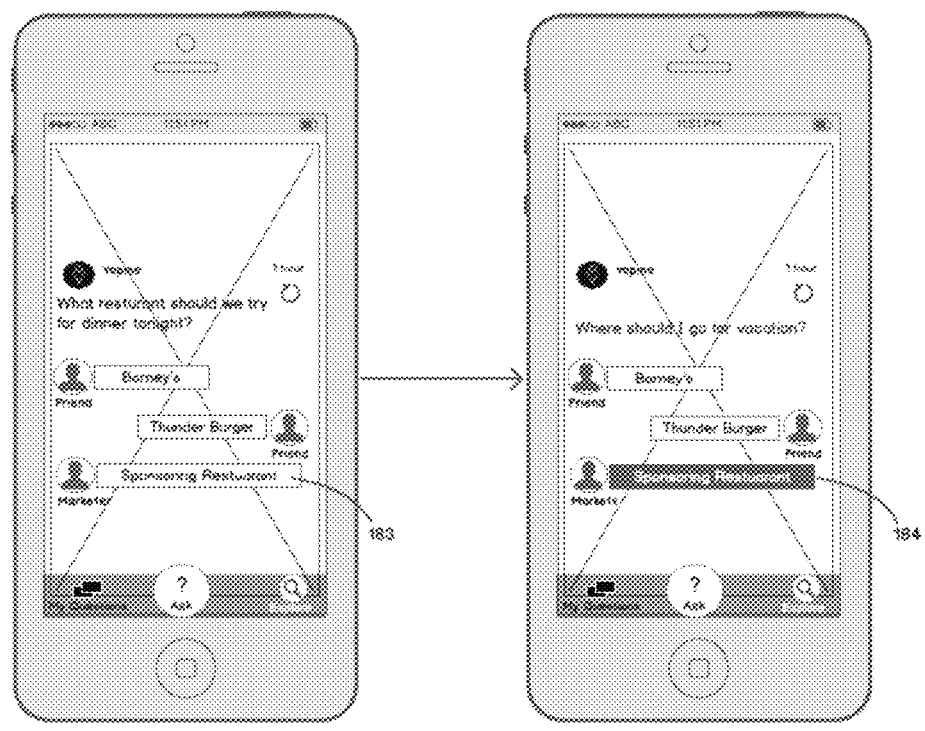

SYSTEM AND METHOD FOR POLLING VIA PROXIMAL AWARENESS

SUMMARY

The present disclosure is directed to a system and a method for generating a poll based upon proximal awareness of one client device to another client device. In one or more implementations, the present disclosure discloses receiving, at a server, digital content data from a first client device in communication with the server via at least one local area wireless signal. The present disclosure also discloses pairing the digital content data with the at least one local area wireless signal. The present disclosure also discloses transmitting the digital content data to a second client device when the second client device detects the at least one local area wireless signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

It is to be understood that the drawings are not to be used for the purposes exemplary illustration only and not as definition of the limits of the disclosure. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding part(s) throughout:

FIG. 1 is an illustration of the highest-level viewpoint of the disclosure's server, network and client topology.

DETAILED DESCRIPTION

Figure 1A:
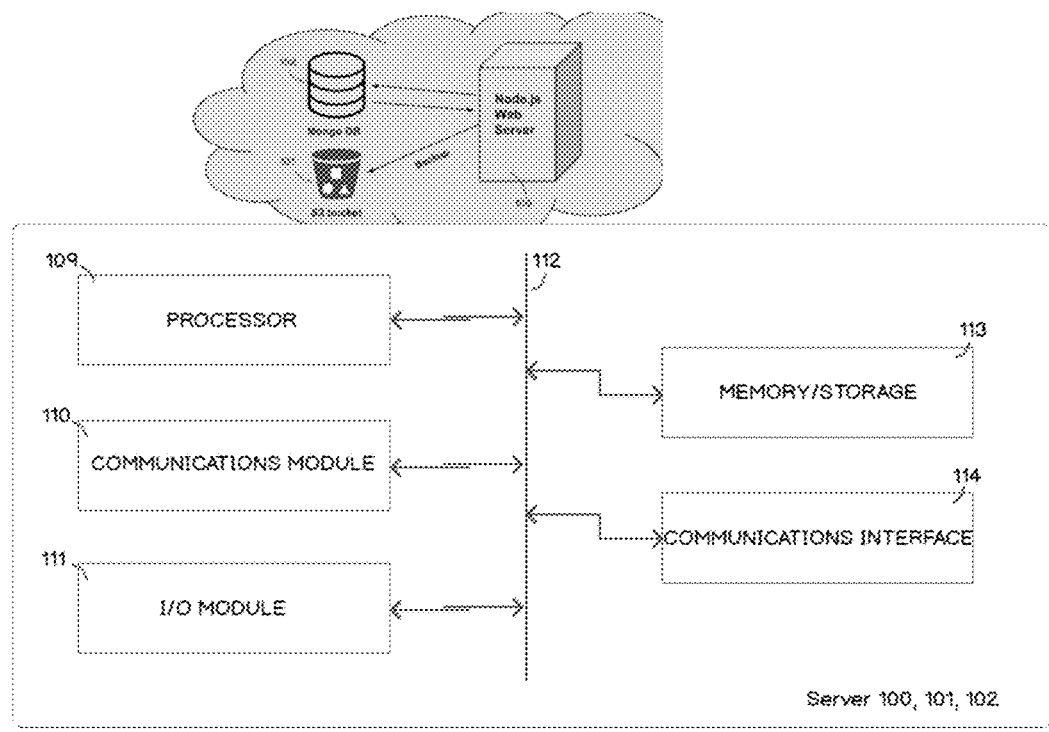
FIG. 1A is an example illustration of computing environment in accordance with the present disclosure.

The detailed description set forth below in connection with the appended drawings is intended as a description of presently preferred embodiments of the disclosure and is not intended to represent the only forms in which the present disclosure maybe constructed and or utilized.

For purposes of illustration, programs and other executable program components are illustrated herein as discrete blocks, although it is recognized that such programs and components may reside at various times in different storage components, and are executed by the data processor(s) of the computers. Further, each block within a flowchart may represent both method functions(s), operation(s), or act(s) and one or more elements for performing the method function(s), operation(s) or act(s). In addition, depending upon the implementation, the corresponding one or more elements may be configured in hardware, software, firmware, or combinations thereof.

Henceforth, when it is necessary to distinguish the various member, elements, sections/portions or components of the different types of icons or any other aspects from each other, the description will be accompanied by reference numbers which are reflected on the accompanying diagrams. Numerals related to specific features, labels, buttons or areas of the entire system will be plain ascending numbers of the form ex "123". If the need to refer back to a feature already referenced, the format '123' will remain, as a feature may exist in the same state in many places throughout the computer system.

The following described computer hardware and software are presented for purposes of illustrating the basic underlying client device and server computer components that may be employed for implementing the present disclosure. For purposes of discussion, the following description will present examples in which it will be assumed that there exists one or more "server" (e.g., media content database server and/or media content application server) that communicates with one or more client devices (e.g., personal computer, mobile electronic devices, and others). The present disclosure however is not limited to any particular environment or device configuration. In particular a client/server distinction is not necessary to the disclosure but is used to produce a framework for discussion. Instead, the present disclosure may be implemented in any type of system architecture or processing environment capable of supporting the methodologies of the present disclosure presented in detail below. Therefore, for example, while the present disclosure may operate within a single computing machine (server or client device) or operate directly between client devices without the use of servers, the present disclosure is preferably embodied in a computer system such as client server site. Client/server environments, database and or application servers, and networks are very well documented in technical, trade and patent literature.

Throughout the present disclosure the term 'user' or 'end user' may refer to one or more entities that create or reply to a content item (poll or brainstorm). This disclosure relates to polling (and brainstorming) delivered by individuals (or groups) heretofore known as 'pollster' to individuals or groups heretofore known as 'pollee' via proximal ambient wireless fidelity (Wi-Fi), Bluetooth, Low Energy Bluetooth (BLE), iBeacon and LTE Direct signal. This disclosure also relates to polling delivered by pollster to pollee via global positioning system (GPS). This disclosure also relates to the collecting of brainstorm ideas to be dynamically and instantly turned into a poll. This disclosure also relates to polling directly to a pollee or a group of pollees via social media (e.g., Facebook, Twitter and phone contact lists) or the like. This disclosure also relates to providing marketers the opportunity to uniquely market to pollsters/pollees who use certain word potentially related to the marketer's product(s) or brand(s).

A polling engine and method assisting in gathering opinions and related data for identifiable events and/or generic questions based on the pollster's desire to obtain information from a group of individuals amassed at a given location.

The present disclosure derives feedback and relevant data based on a subject's presence and proximity to existing, pervasive and ubiquitous ambient Wi-Fi radio signal, Bluetooth, Low Energy Bluetooth (BLE), iBeacon and LTE Direct in a given area. The pollee's responses represent functional measurements and data not obtainable through any other measure short of asking each person present verbally. The present disclosure assists in the determination of real world, in the moment opinion, feeling, attitude and interest relative to the pollee's question(s).

A polling engine and method assisting in gathering opinions and related data for identifiable events and/or generic questions based on the pollster's desire to obtain information from a group of individuals amassed at a given location.

The present disclosure derives feedback and relevant data based on a subject's presence as determined by GPS geo-fencing technology in a given area. The pollee's responses represent functional measurements and data not obtainable through any other measure short of asking each person present verbally Yopine's Proximal Awareness via Wi-Fi radio signal, Bluetooth, Low Energy Bluetooth (BLE), iBeacon and LTE Direct Signal discussed herein.

The present disclosure assists in the determination of real world, in the moment opinion, feeling, attitude and interest relative to the pollee's question(s).

A polling engine and method assisting in gathering opinions and related data for identifiable events and/or generic questions based on the pollster's desire to obtain information from a group of individuals.

In particular, a flavor of polling dubbed 'Brainstorm'. A Yopine Brainstorm is a poll where a question is asked only unlike a typical poll where voting options are provided; the Yopine Brainstorm elicits free-form replies. It can be described as question and answer vs. question and option as in a traditional poll. The present disclosure takes the Yopine concept of a Brainstorm and electronically converts it into a poll. The audience replies free form to the question. The pollster (person asking the brainstorm question aka the Yopine user) then selects the brainstorm replies they like best by tapping them (thus highlighting them). Once two responses are chosen (the minimum requirement to constitute a Poll, a 'B2P' button appears. The pollster can select as few as 2 or as many as N responses. When the Pollster is satisfied with the options, they simply tap 'B2P' and instantaneously the Yopine software electronically renders the new poll.

The present disclosure assists in providing not only the Pollster with a valid poll but moreover insures the Pollees will find the options in the realm of desire due to their having been the individuals from whom the options were culled.

A polling engine and method assisting in gathering opinions and related data for identifiable events and/or generic questions based on the pollster's desire to obtain information from a group of individuals amassed by accessing and selecting pollees from sources:

1 Phone on board contacts—10 digit phone number
2 Direct access via API to user's Facebook friend list
3 Direct access via API to user's Twitter follower list The present disclosure allows users to poll the above named combination or pollees by selecting from the three sources individually up to N recipients OR by creating a 'Group'. The present disclosure assists in the ease and reach and validity of the poll by making it simple to create reusable groups of their various (above 3) sources of contacts. The invited contact is alerted when the pollster includes them in a poll thereby vastly enhancing the poll results and the value of the resulting data.

A polling engine and method assisting in enabling paying advertisers to 'purchase' or 'own' any word (or symbol, trademark, logo or combination of characters, images, emojis, etc.) with the intent and purpose of placing their product, brand, service, trade-name, logo or other marketing implement as, in the case of a poll, an 'option' and in the case of a brainstorm, an 'idea'.

Further, but not limited to, marketers can do so for a specified geographical radius such that when a Yopine user randomly or deliberately uses that keyword in a BSP, the marketer's brand (and representations previously defined) appears as an option or idea as the case may be. This disclosure is affected by using a combination of PAM (Proximal Awareness) for pollee and PAM (GPS) for pollster.

FIG. 1 illustrates the general overview of a client/server database system suitable for implementing the present disclosure. As shown, the system interacts with one or more client devices 107 connected to a server 100 and application data storage 101 and 102 via the Internet/network 106 and TCP/IP or WiFi (WIFI) 108. The TCP/IP or WiFi 108 network may assume a wide variety of configurations. For example, the network may comprise any of a plurality of communications standards, protocols and technologies, including, but not limited to: a 3G communications network, a 4G communications network, a Global System for Mobile Communications (GSM) environment, an Enhanced Data GSM Environment (EDGE) network, a high-speed downlink packet access (HSDPA) network, a wideband code division multiple access (W-CDMA) network, a code division multiple access (CDMA) network, a time division multiple access (TDMA) network, Bluetooth, Wireless Fidelity (Wi-Fi) (e.g., IEEE 802.11a, IEEE 802.11b, IEEE 802.11 g and/or IEEE 802.11n), voice over Internet Protocol (VoIP), Wi-MAX, a protocol for email (e.g., Internet message access protocol (IMAP) and/or post office protocol (POP)) environment, an instant messaging (e.g., extensible messaging and presence protocol (XMPP) environment, Session Initiation Protocol for Instant Messaging and Presence Leveraging Extensions (SIMPLE), and/or Instant Messaging and Presence Service (IMPS), and/or Short Message Service (SMS)), or any other suitable communication protocol, that facilitates communication between the client devices 107 and the servers 100, 101, 102. Specifically, the client devices 107 comprise one or more stand alone client devices (i.e. mobile phones or tablets) connected to one or more database server system 100 and application data storage 101 and 102. In an embodiment of the present disclosure, a client device (e.g., a mobile electronic device, such as a smartphone) scans for the N strongest ambient WIFI signals 158. More specifically, the system ranks the ambient WiFi signals 158 in order of signal strength so that the client device 107 can select all, none, or any combination of ambient WiFi signals 158. The client device 107 is configured (e.g., through a computer application, etc.) to affix (e.g., "pairs") content (e.g., polling content, brainstorming content, etc.) retained on the client device with the N strongest local area wireless technology signals (ambient WiFi signals 158, etc.) based upon a MAC address 159 (e.g., a WiFi name MAC address) associated with the respective local area wireless technology signal. The client device 107 may then transmit the content for storing in a server (e.g., such as storing the content in a cloud based server 99). This method enables client device operator to expand or limit the reach of the pinned content to a wider or more narrow radius as desired. In this embodiment, other client devices 107 may come into communication with one or more of the N local area wireless technology signals 158, and these client devices may also employ the computer application discussed herein and above. As such the computer application may cause the respective devices to scan for content affixed to the scanned local area wireless technology signals and/or MAC addresses 159. In an embodiment, when both client devices are in contact (e.g., ambient contact) with the local area wireless technology signals 158, a connection between the client devices is established and the content can be shared between the devices. In another embodiment, when a client device 107 establishes a communication with one or more of the N local area wireless technology signals 158, the cloud-based server 99 may provide the content to the client device(s) 107.

As illustrated in FIG. 1, the computing machines necessary for implementing the system of the present disclosure will hereinafter be referred to imply as server/servers 99 and client/clients 107.

The general system architecture upon which all portions of the disclosure run is hosted in a cloud computing architecture 99 (e.g., cloud computing environment). These components consist of a front-end platform client device 107 (e.g., desktop client, mobile device—phone or tablet), back end platforms (servers/storage devices 100, 101, 102, collectively 99), a cloud based delivery system 99, and a network 106.

FIG. 1A—The cloud based delivered environment 99 hosts three part server cluster 100, 101, 102. In implementations, the server clusters 100, 101, 102 may comprise media server clusters. Each cluster 100, 101, 102 includes a processor 109, communications module 110 (network I/O, wireless or TCP/IP, Internet), I/O module connecting to the (computer server BUS system) motherboard 112, memory 113 (memory/storage RAM—random access memory, ROM—read only memory, hard drives, cloud database storage and fixed massive storage devices, tape backup), and a communications interface 114 in the form of wired or wireless protocols.

Figure 1B:
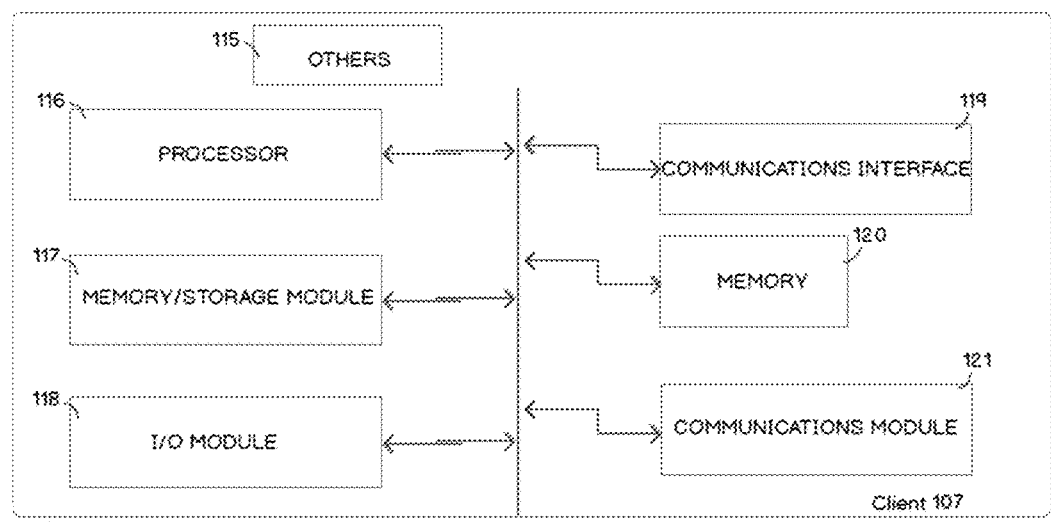
FIG. 1B is an example illustration of computing machine as client device hardware.

FIG. 1B—Each client device 107 may comprise a processor 116, input/output devices 115 (such as an image/video/sound capture device—camera, microphone or other such input devices), communications module 119 (network I/O, wireless or TCP/IP, Internet), I/O module 118 connecting to (computer server BUS system) motherboard, memory 120 (memory/storage RAM—random access memory, ROM—read only memory, hard drives, cloud database storage and fixed massive storage devices, tape backup), and a communications interface 121 communications interface in the form of wired or wireless protocols.

Figure 2A:
FIG. 2 is a non-limiting, example diagram schematically illustrating the home screen and navigation to other modules and functionalities of the present disclosure and illustration of polling using proximal awareness via Wi-Fi radio signal, Bluetooth, Low Energy Bluetooth (BLE), iBeacon and LTE Direct signal that includes FIGS. 2A through 2N illustrating example screenshots of polling using proximal awareness in accordance with an example embodiment of the present disclosure and FIG. 2O that illustrates example wireless network devices in accordance with an example embodiment of the present disclosure.
FIG. 2P illustrates an example wireless registry in accordance with an example embodiment of the present disclosure.
Figure 2B:
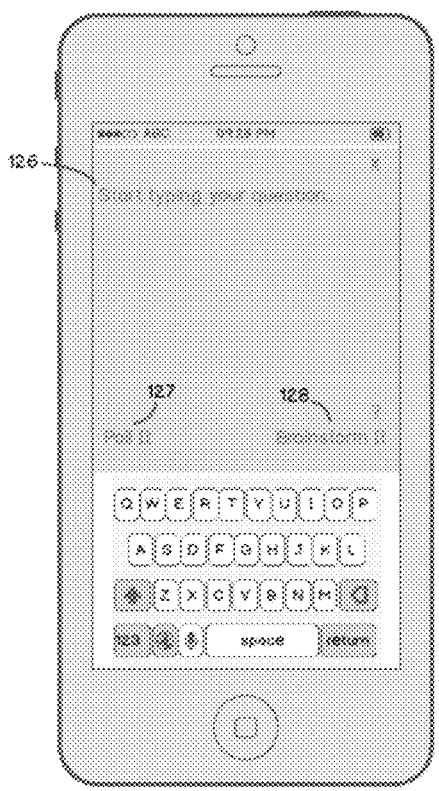

FIG. 2 (as shown individually in FIGS. 2A through 2P illustrates polling using proximal awareness via Wi-Fi radio signal, Bluetooth, Low Energy Bluetooth (BLE), iBeacon and LTE Direct signal. FIG. 2A illustrates the home screen of the polling and brainstorming application in accordance with the present disclosure provides central navigation to all features of the application as well as provides the logical starting point of Graphical User Interface (GUI) 122 'Ask'. GUI 122 Ask can be tapped and immediately taken to FIG. 2B. The lower portion of the screen of on FIG. 2. A containing GUIs 123, 124, 125 is known as the 'tray'. The tray serves as the path to another feature of the present disclosure that will be described in full detail in subsequent sections. GUI 123 is the direct link to FIG. 2I known colloquially as 'My Questions'. GUI 124 takes the user back to the main 122 Ask location should they navigate away. GUI 125 is the direct link to FIG. 2J known as the 'Explore' screen. FIG. 2B is where the user arrives having tapped GUI 122. GUI 126 is the area where the user is enabled to ask any question they wish. GUI 127 will take the user to FIG. 2D where they may construct the poll version of content for the present disclosure. GUI 128 will take the user to FIG. 2C where they may construct the brainstorm version of content for the present disclosure.

Figure 2C:
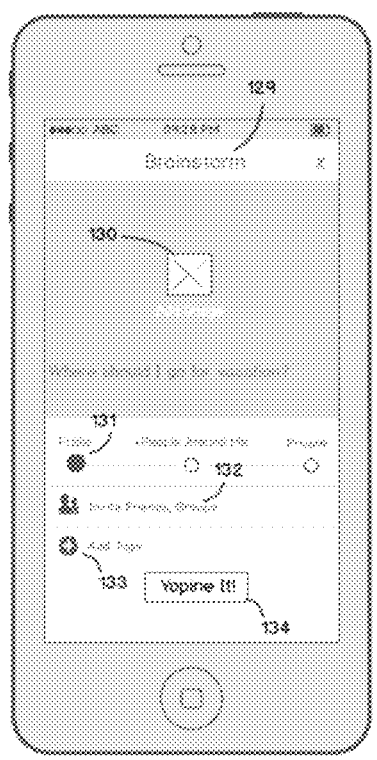
Figure 2D:

FIG. 2C illustrates brainstorm GUI 129 representing a brainstorm construction screen. The brainstorm GUI 129 can be defined as an open question that elicits free form open answers 153 as contributions or responses to the question at hand. GUI 130 enables the user to choose an image to accompany the question. The GUI 130 image options can be as follows: a search engine (e.g., Google) searched image based on any terms or words; social media (e.g., Instagram) searched image; photo taken by the device's camera; image saved in the device's photo albums. GUI 131 is the default audience of 'Public'. When GUI 132 is actuated makes the brainstorm/poll visible and available to any user as seen in FIG. 2J. GUI 132 causes the application to transition to the GUI shown in FIG. 2G known as "Invite Friends, Groups'. GUI 133 takes user to FIG. 2H known as "#Tags". GUI 134 causes execution a constructed brainstorm or poll and places the content into the hands of the intended recipients. FIG. 2D illustrates a GUI 135 for constructing a poll. A poll 135 is defined as an open question accompanied by pre-defined options 136 as choices-as-answers to the question at hand.

Figure 2E:
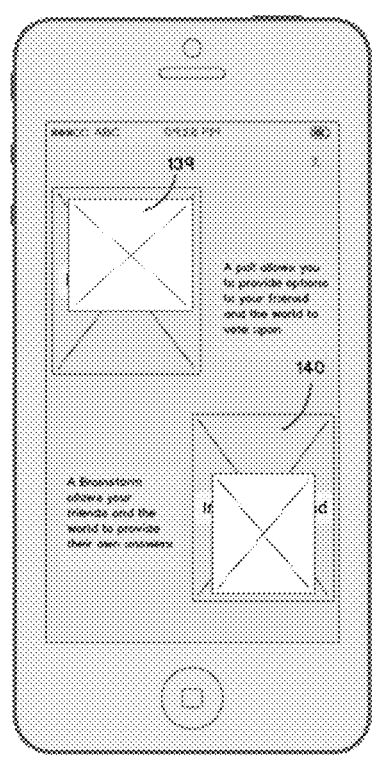
Figure 2F:
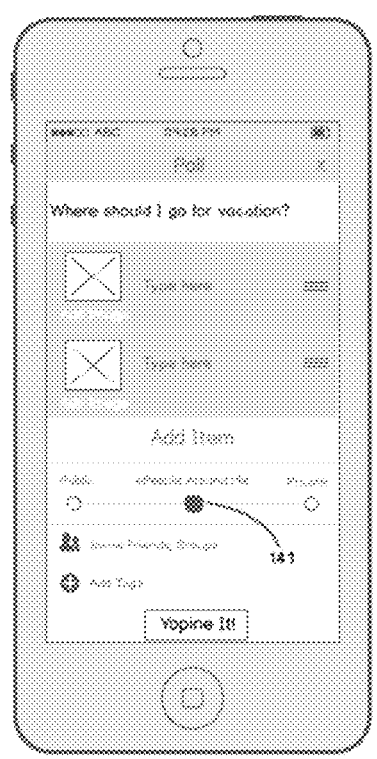

FIG. 2E is a help feature that, when invoked, provides a brief yet illustrative description of the two (2) types of content in the present disclosure. For example, GUI 139 defines a poll in the context of the present disclosure. GUI 140 defines a brainstorm in the context of the present disclosure. FIG. 2F represents an embodiment of the present disclosure [Polling using proximal awareness via Wi-Fi radio signal, Bluetooth, Low Energy Bluetooth (BLE), iBeacon and LTE Direct signal]. Proximal awareness describes a concept of knowing or being aware of something as a result of being in a certain vicinity. In the case of the present disclosure, a client device 107 is proximally aware of some content existing on wireless network device 159 (e.g., a wireless router, etc.) because of its relative vicinity to client device 107. The GUI 141 "+People Around Me" is the option that is selected to invoke (e.g., causes the application to cause the client device 107) the technology that "pairs" client device 107 client device with the content (brainstorm or poll as the case may be). This technology is a matter of pairing physical characteristics of one item (e.g., the poll or brainstorm represented initiated through client device 107) via the cloud based delivery system 99, and/or servers/storage devices 100, 101, 102 to physical characteristics of another client device 107 via a wireless registry 103 residing and executing via one or more wireless network devices 159. The client device 107 creates content (a poll or brainstorm) for the present disclosure, which is transmitted via a network 108 (e.g., through the Internet 106), communicates with the wireless registry 103 and is stored in the cloud based delivery system 99 (e.g., servers/storage devices 100, 101, 102). An infinite number of different client devices 107 may come along and if their relative proximity is such that they are in ambient contact with the same wireless network device 159 as the original client device 107, the new client device(s) 107(s) collect the created content. For instance, once the client device(s) 107 are in relative proximity to the wireless network device 159, an application residing on the client device 107 causes the wireless network device 159 to push the content to the client device 107. The client device 107, upon creation of content (poll or brainstorm) scans the ambient radius for Wi-Fi radio signal, Bluetooth, Low Energy Bluetooth (BLE), iBeacon and LTE Direct signal and records them as MAC addresses. The client device 107, upon invoking GUI 141, associates by pairing the numeric representation of the content with the aforementioned-recorded MACs. These paired couplings (content and MAC) are then be stored in cloud-based delivery system 99. Thus, upon the creation of these pairings, the present disclosure has described techniques for delivering and making available proximity based content due to ambient contact between the two entities (client and server) and has made such content available to any subsequent client devices 107 that come into contact with the ambient Wi-Fi signal. The client device(s) 107 that come into the vicinity of the content via the wireless network device 159 are aware of the data representing the content and display the content by collecting and displaying the existing pairs in FIG. 2.J.

Figure 2G:
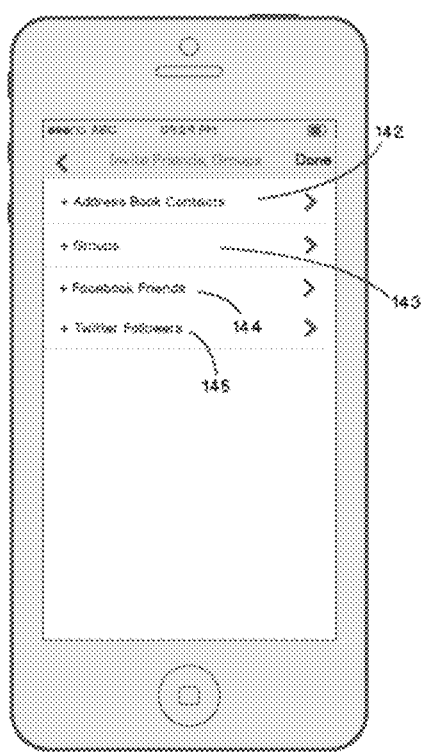
Figure 2H:
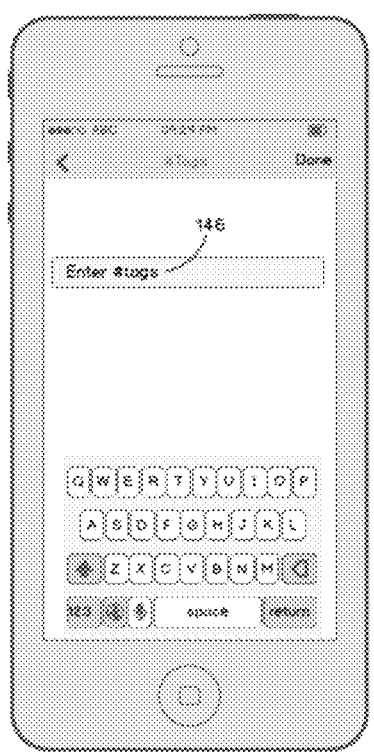
Figures 2I, 2J:
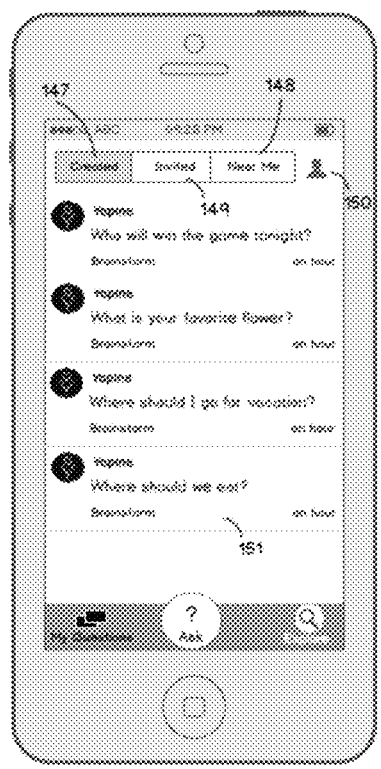
Figure 2K:
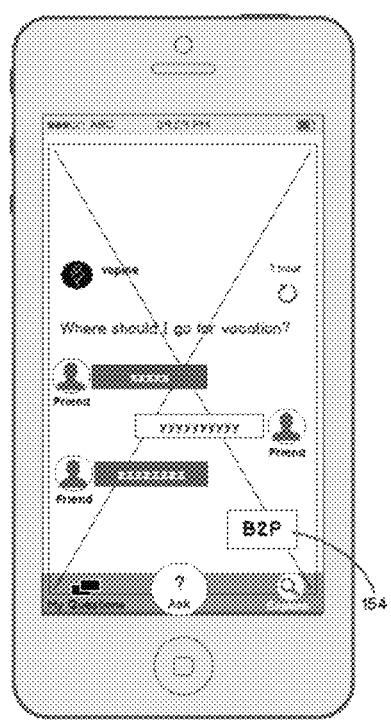
Figure 2L:
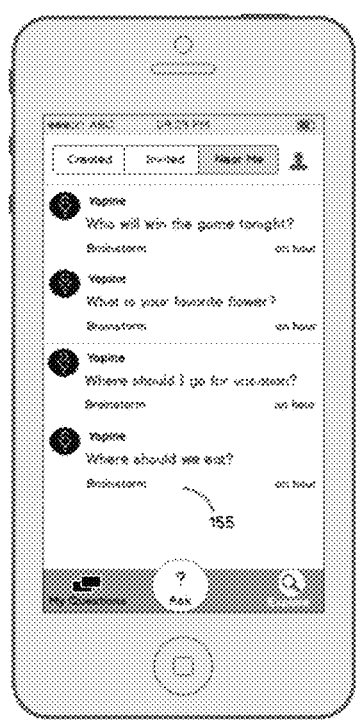

FIG. 2G illustrates techniques to manage the way(s) to invite others to participate in created content that is not proximally aware such as the immediately preceding section. GUI 142 initiates the application to illustrate the GUI shown in FIG. 5H of the client device 107 onboard contact list or address book. GUI 143 calls FIG. 5I of the 107 'My Groups'. GUI 144 calls FIG. 5J of the 107 'Add Facebook Friends'. GUI 145 calls FIG. 5K of the client device 107 'Add Twitter Followers'.

FIG. 2I is the display of the 'My Questions' tray item. The GUI 147 provides for 'Created' displays representing a list of content created (as described above) by the current user. GUI 149 displays a list of content to which the current user was invited via the methods described above. GUI 151 is a summary of content type Brainstorm. Choosing that item will explode it out in to its full form view. GUI 150 will take the user to the 'Profile' section that is wholly unrelated to any section of the present disclosure. GUI 148 displays the content core to this section of the present disclosure, which is 'Near Me' or in the proximal vicinity. FIG. 2J illustrates the exploded version of content type brainstorm. GUI 152 represents an avatar and name of a brainstorm idea contributor via the client device 107. GUI 153 is the actual response or contribution or idea provided by contributor via the client device 107.

Figure 2M:
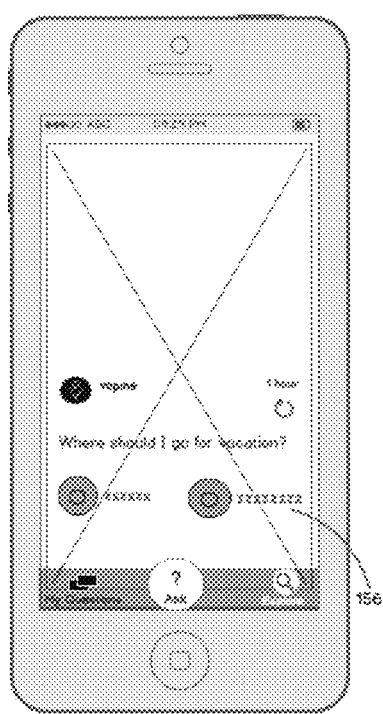
Figure 2N:
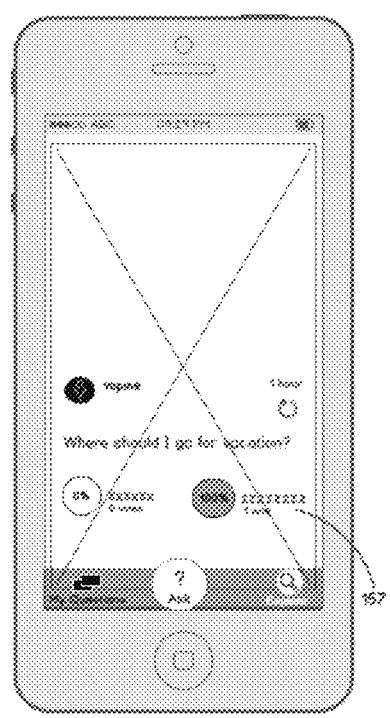

FIG. 2M demonstrates a non-voted view of a poll option 156. FIG. 2N demonstrates a voted view of a poll option 157.

FIG. 2O represents a cluster of wireless signals 158 (e.g., Wi-Fi radio signal, Bluetooth, Low Energy Bluetooth (BLE), iBeacon and LTE Direct signal and wireless network devices 159 (e.g., Wi-Fi routers). The wireless network devices 159 are also known technically as SSID (service set identifier). Each wireless network device 159 has a unique-in-the-world identifying digital fingerprint known as a MAC (media access control) address. The client device 107 communicates with the wireless registry 103 via the Internet 106 and/or wireless network 108 through the cloud based delivery system 99 to create the pairs described above.

FIG. 2P further illustrates the wireless registry 103. The wireless registry 103 (e.g., a wireless registry server) represents a content to wireless signal data store. As shown in FIG. 1A, the wireless registry 103 pairs the content (poll or brainstorm) that is the subject of the present disclosure with the proximal Wi-Fi radio signal, Bluetooth, Low Energy Bluetooth (BLE), iBeacon and LTE Direct signal as described herein.

FIG. 3 illustrates an example flow for polling using proximal awareness using GPS and geo-fencing. FIG. 3A illustrates the home screen of the polling and brainstorming application in accordance with the present disclosure provides central navigation to all features of the application as well as provides the logical starting point of GUI 122 'Ask'. GUI 122 can be tapped (e.g., actuated) to be taken to the GUI shown in FIG. 3B. The lower portion of the screen of on FIG. 3A contains GUIs 123, 124, 125 (e.g., the 'tray' GUI). The tray serves as the path to the other major feature of the application that is described in full detail in subsequent sections. GUI 123 is the direct link to the GUI shown in FIG. 3I known colloquially as 'My Questions'. GUI 124 takes the user back to the main GUI 122 should the user navigate away. GUI 125 provides a link to the GUI shown in FIG. 3J known as the 'Explore' screen. FIG. 3B is where the user arrives having initiated GUI 122 (e.g., "Ask"). GUI 126 is the area where the user is enabled to ask any question they wish. GUI 127 takes the user to the GUI shown in FIG. 3D where the user may construct the poll version of content for the present disclosure. GUI 128 takes the user to the GUI shown in FIG. 3C where the user may construct the brainstorm version of content for the present disclosure.

Figure 3A:
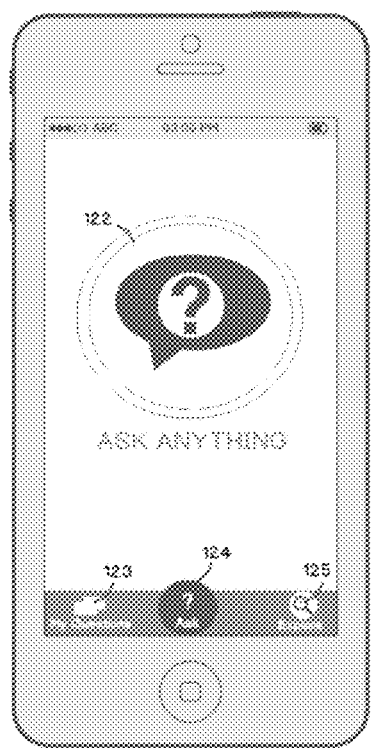
FIG. 3 is a non-limiting, example diagram schematically illustrating the home screen and navigation to other modules and functionalities of the present disclosure and illustration of polling GPS and geo-fencing that includes FIGS. 3A through 3N illustrating example screenshots of polling using Global Positioning System technology and geo-fencing technology in accordance with an example embodiment of the present disclosure and FIG. 3O that illustrates example Global Positioning System technology in accordance with an example embodiment of the present disclosure.
Figure 3B:
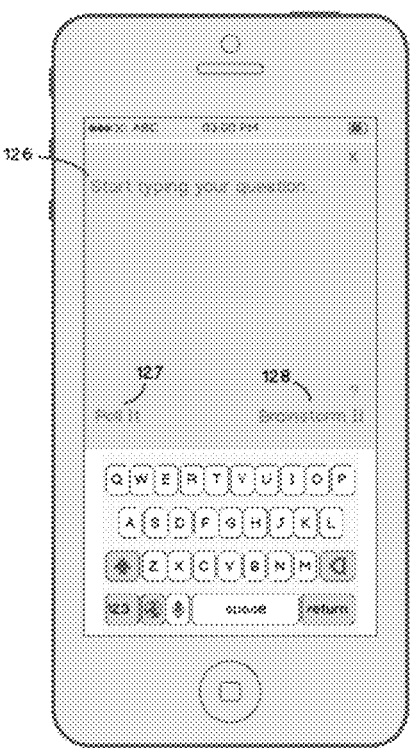
Figure 3C:
Figure 3D:
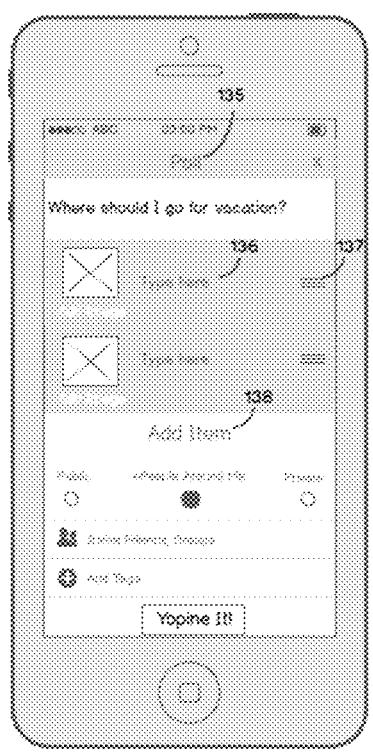

FIG. 3C illustrates GUI 129 for constructing a brainstorm event (e.g., brainstorm construction screen). GUI 129 answers as contributions or responses to the question at hand. GUI 130 enables the user to choose an image to accompany the question. The GUI 130 image options are as follows: search engine searched image based on any terms or words; social media (e.g., Instagram) searched image; photo taken by the device's camera; image saved in the device's photo albums. The GUI 131 is set to the default audience of 'Public'. GUI 132, when chosen, makes the brainstorm/poll visible and available to any user as seen in FIG. 3J 'Explore'. The GUI 132 takes the user to the screen shown in FIG. 3G known as "Invite Friends, Groups'. The GUI 133 takes user to the screen shown in FIG. 3H known as "#Tags". GUI 134 executes a constructed brainstorm or poll and places the content into the hands of the intended recipients. FIG. 3D illustrates poll GUI 135 for constructing polling events/content (e.g., a poll construction screen). A poll GUI 135 is defined as an open question accompanied by pre-defined options 136 as choices-as-answers to the question at hand.

FIG. 3E is a help feature that, when invoked, provides a brief yet illustrative description of the 2 types of content in the present disclosure. The poll 139 defines a poll in the context of the present disclosure. The brainstorm 140 defines a brainstorm in the context of the present disclosure. FIG. 3F represents the section of the present disclosure [Polling using proximal awareness using GPS and geo-fencing] as a combination of the polling and brainstorming app coupled with the on-board device GPS and geo-locating features. In this case, GUI 141 "+People Around Me" is the option that is selected to invoke the technology that matches, or "pairs," the client device 107 with the content (e.g., brainstorm or poll). This technology is a matter of pairing characteristics of the client device 107 (the poll or brainstorm created by at the client device 107) using the cloud based delivery system 99, and/or servers/storage devices 100, 101, 102 to characteristics of another client device 107 using FIG. 3O residing and executing using suitable Global Positioning Systems 160, 161. The client device 107 creates content (a poll or brainstorm) for the present disclosure, which is transmitted using network 108 through the Internet 106 and provided to the wireless registry 103. The content (e.g., digital content or data represented the created content) is stored in the cloud based delivery system 99 (e.g., servers/storage devices 100, 101, 102). An infinite number of different client devices 107 may exist and if they are targeted by the client 107 creating content relative geo-location as specified by the targeting client device 107 in FIG. 3O, the new client device(s) 107 can access and collect the created content. For instance, the client devices 107 entering the relative geo-location may be made aware (e.g., pushed) the created content via cloud based delivery system 99 (e.g., servers/storage devices 100, 101, 102). The client device(s) 107, upon creation of content (poll or brainstorm) can scan using geo-locating features of the client device 107 for new content.

Figure 3G:
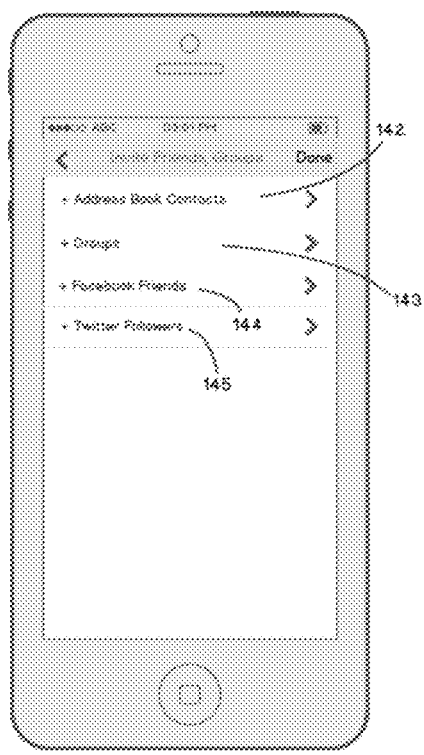
Figure 3H:
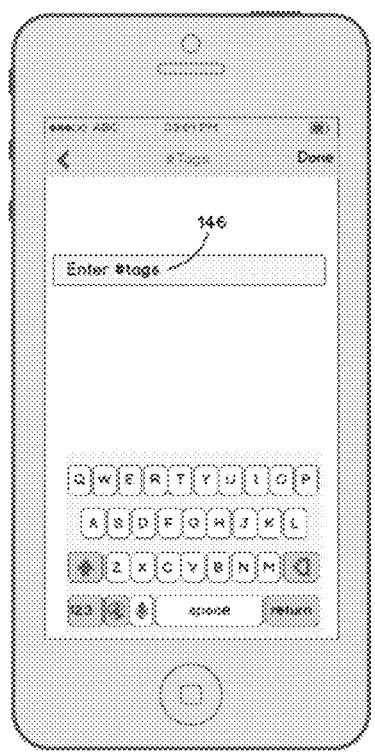
Figures 3I, 3J:
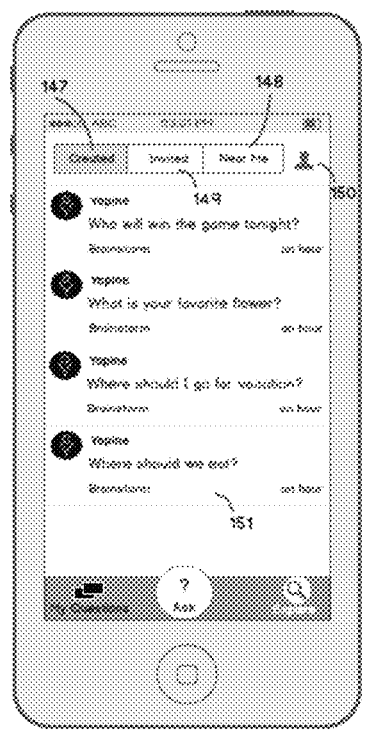
Figure 3K:
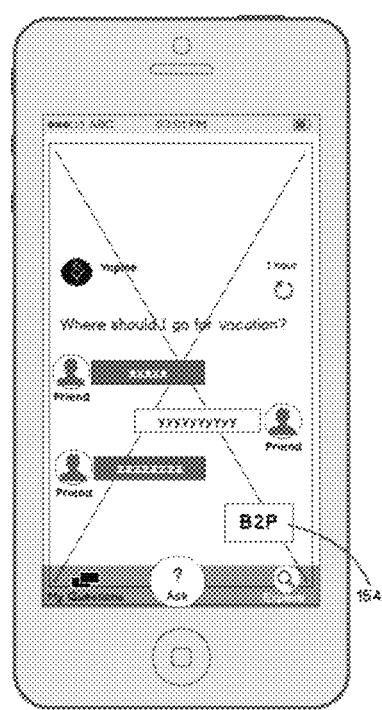
Figure 3L:

FIG. 3G manages the way(s) to invite others to participate in created content that is not proximally aware such as the immediately preceding section. GUI 142 provides the GUI illustrated in FIG. 5H of the client device's 107 onboard contact list or address book. The GUI 143 calls FIG. 5I of the client device 107 'My Groups'. The GUI 144 calls FIG. 5J of the 107 'Add Facebook Friends'. The GUI 145 calls FIG. 5K of the 107 'Add Twitter Followers'.

FIG. 3I is the display of the 'My Questions' tray item. The GUI 147 illustrates a 'Created' displays for listing content created (as described above) by the current user. The GUI 149 displays a list of content to which the current user was invited via the methods described above. The GUI 151 is a summary of content type Brainstorm. Choosing that item can cause display of the created content in full form view. The GUI 150 takes the user to the 'Profile' section that may be wholly unrelated to any section of the present disclosure. The GUI 148 displays the content core to this section of the present disclosure, which is that which is 'Near Me' or in the proximal vicinity. This content is described herein. FIG. 3J illustrates the exploded version of content type brainstorm. The GUI 152 is an avatar and name of a brainstorm idea contributor via the client device 107. GUI 153 represents an example actual response or contribution or idea provided by contributor via the client device 107.

Figure 3M:
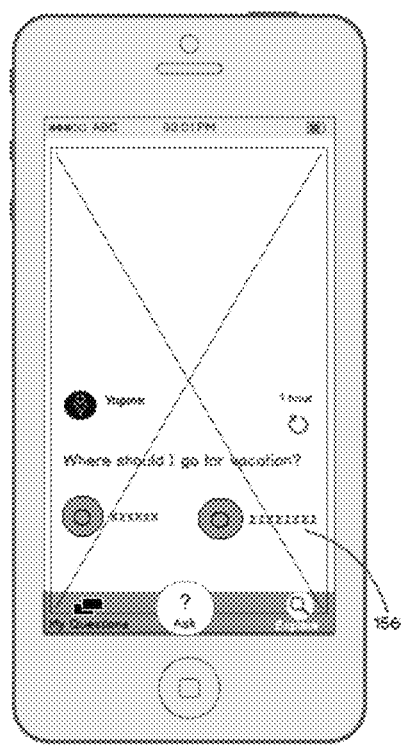
Figure 3N:
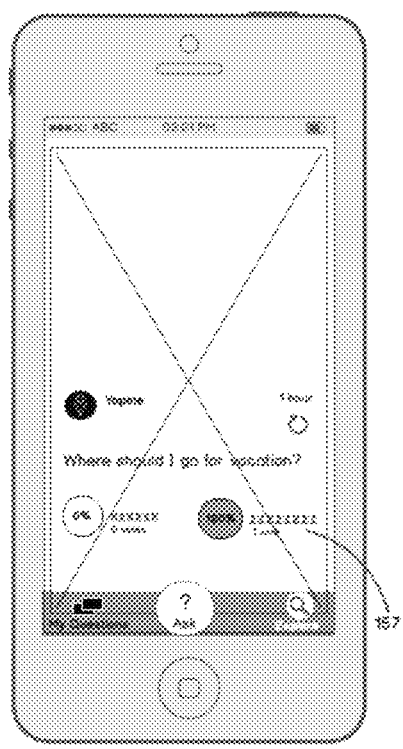
Figure 30:
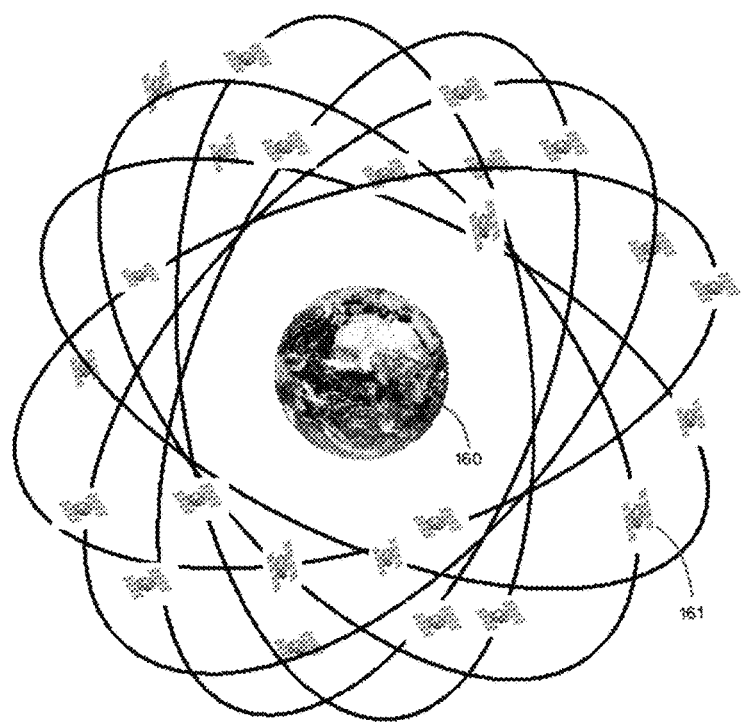

FIG. 3M demonstrates non-voted view of a poll option 156. FIG. 3N demonstrates a voted view of a poll option 157.

FIG. 3O is a graphical depiction of standard Global Positioning Systems—GPS. Client device 107 OEM GPS technology communicates with the wireless registry 103 via Internet 106, network 108 through the cloud based delivery system 99 to create the pairs described above to enable the present disclosure.

FIG. 4—Creating an electronic poll out of an electronic brainstorming session—B2P or brainstorm to poll is a feature in the present disclosure that enables clients to gather a list of suggestions on any topic and then employ a method for 'deciding' for a given population (gathering, meeting, friends, festival etc.) by dynamically turning chosen contributions into the ultimately resulting poll voting options. As shown in FIG. 4A, the present disclosure may be begin with the aforementioned 'Brainstorm' content creation or an open question that elicits free-form responses from the client device 107 in the form of ideas and contributions. The process starts with question 163. Once the brainstorm is shared with the client device 107 via any and all of the aforementioned methods, a client device 107 may add an idea and contribute via interface 164.

Figure 4A:
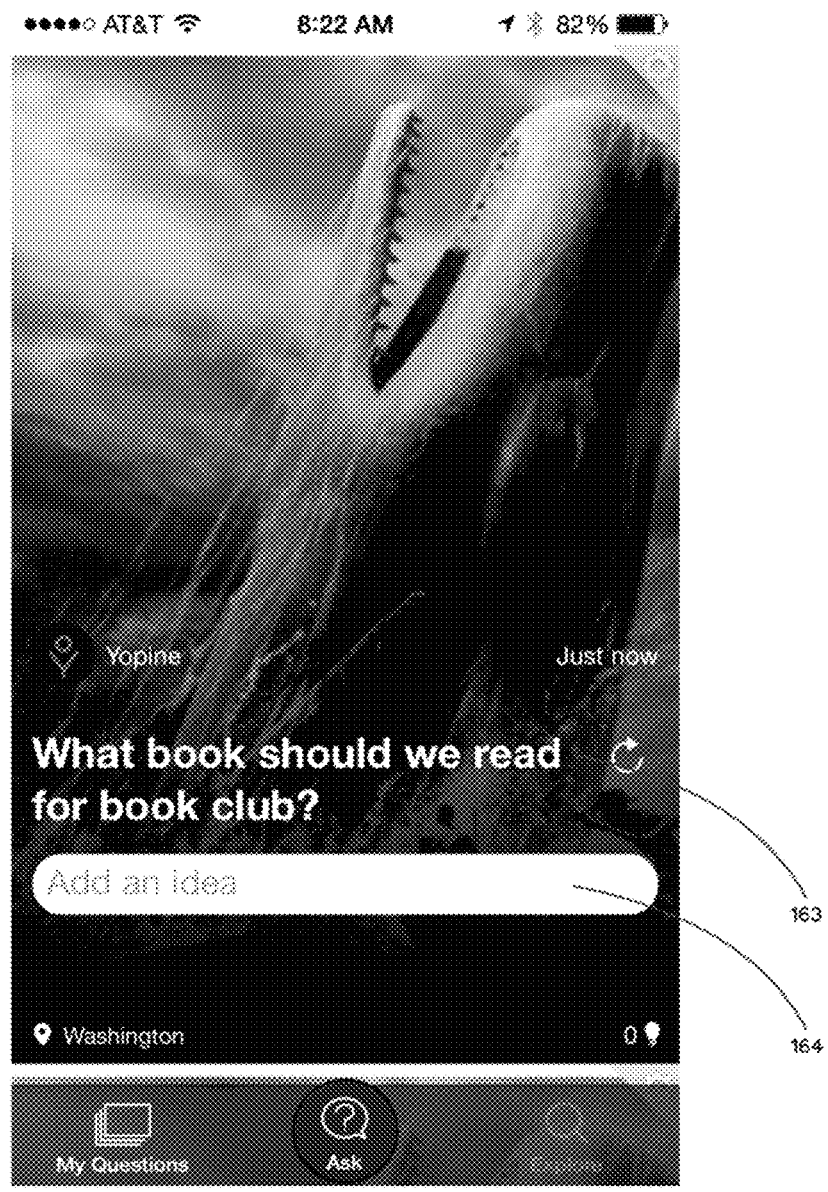
FIG. 4 is a non-limiting, example diagram schematically illustrating first, a 'Brainstorm' (FIG. 4A); 'Brainstorm' ideas/contributions (FIG. 4B); 'Brainstorm' selected ideas/contributions (FIG. 4C) and 132P'; a 'Poll' that was created as a result of the previous three FIGs (FIG. 4D).
Figure 4B:
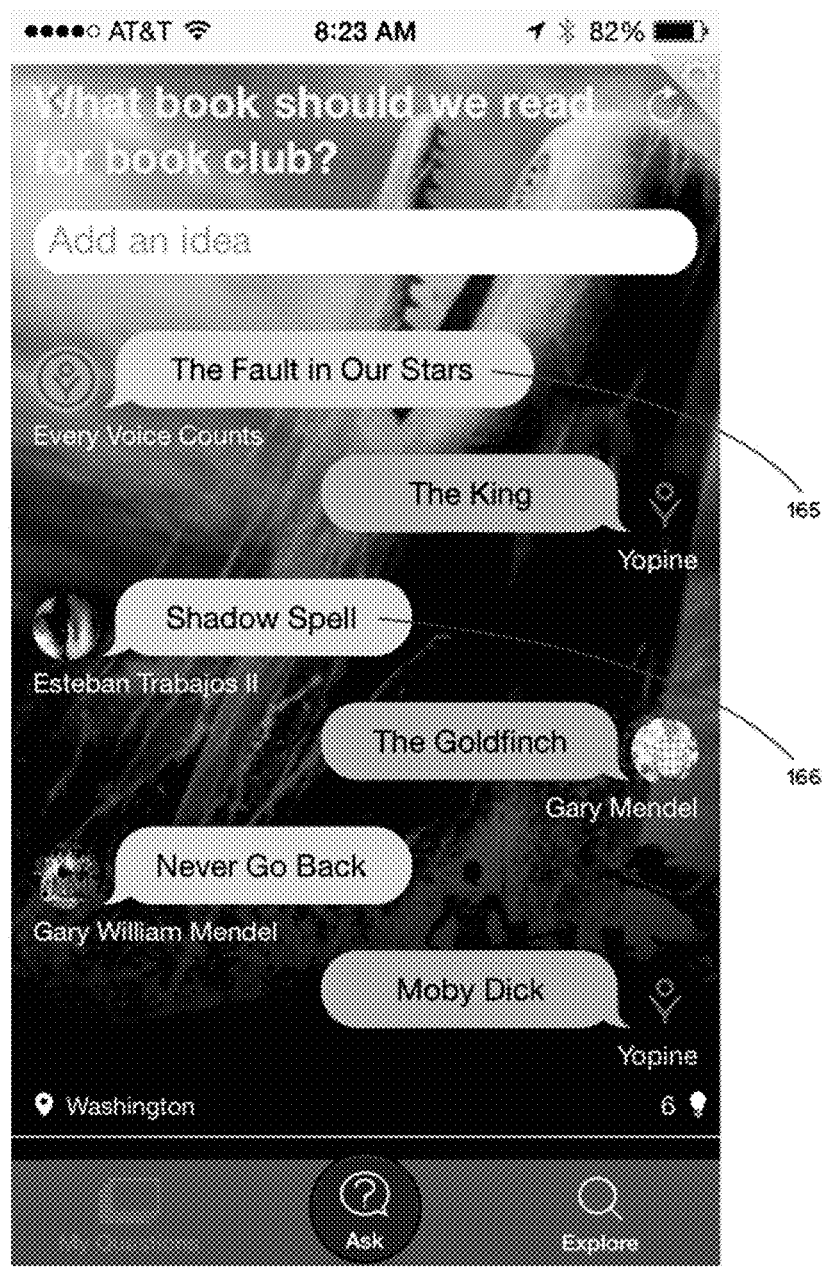
Figure 4C:
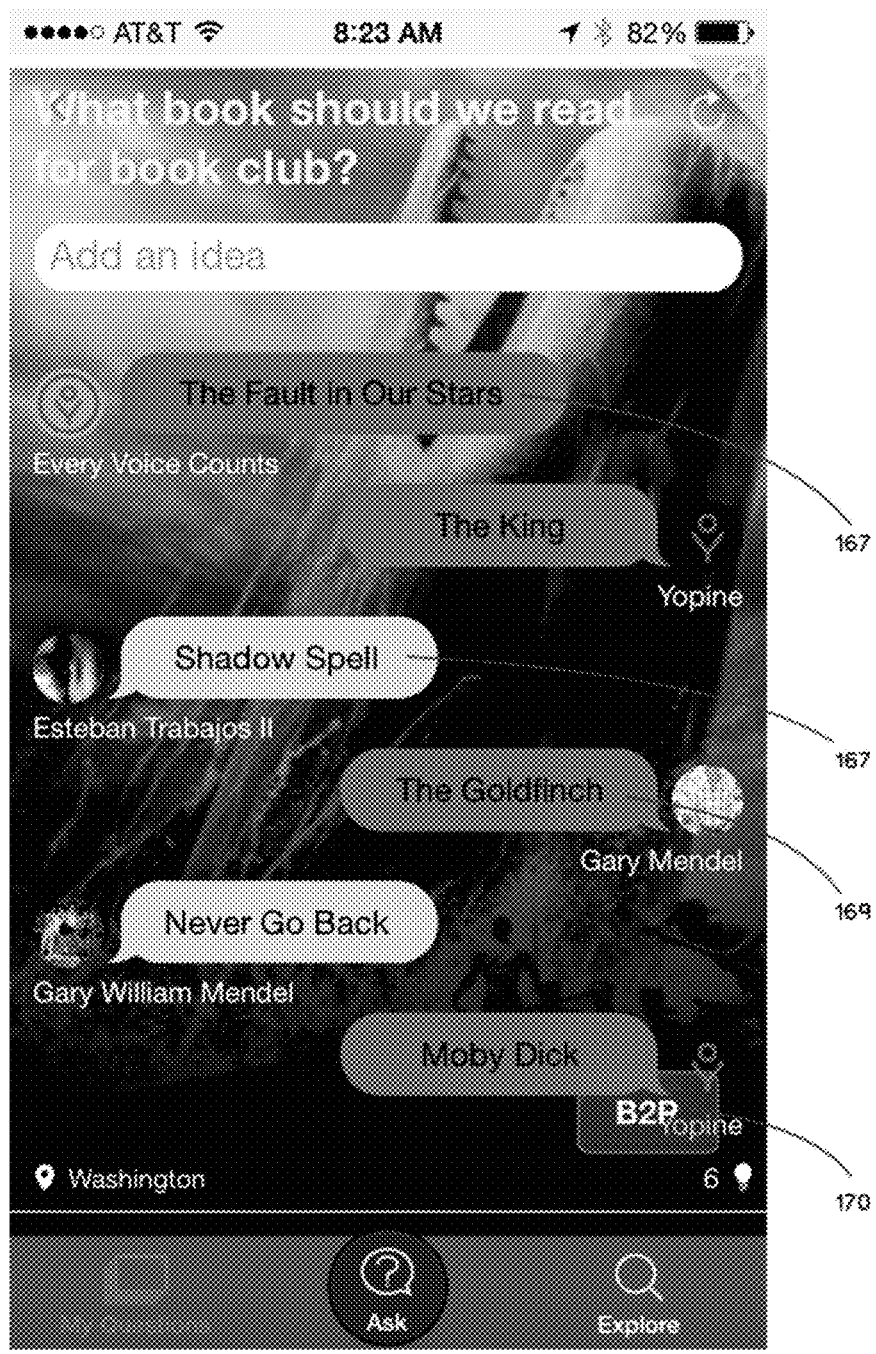

FIG. 4B illustrates displaying six ideas/contributions 165 from the client device 107 via any and all of the aforementioned methods. FIG. 4C illustrates the offering of a client device 107 selecting (by tapping or clicking) selections (e.g., interfaces) 167, 169, 170 as their choices and foregoing interface 167 as a selection. Once the two or more selections 167 are made, 170 the 'B2P' button ("interface) is presented. 'B2P' is an acronym for 'Brainstorm to Poll'.

Figure 4D:
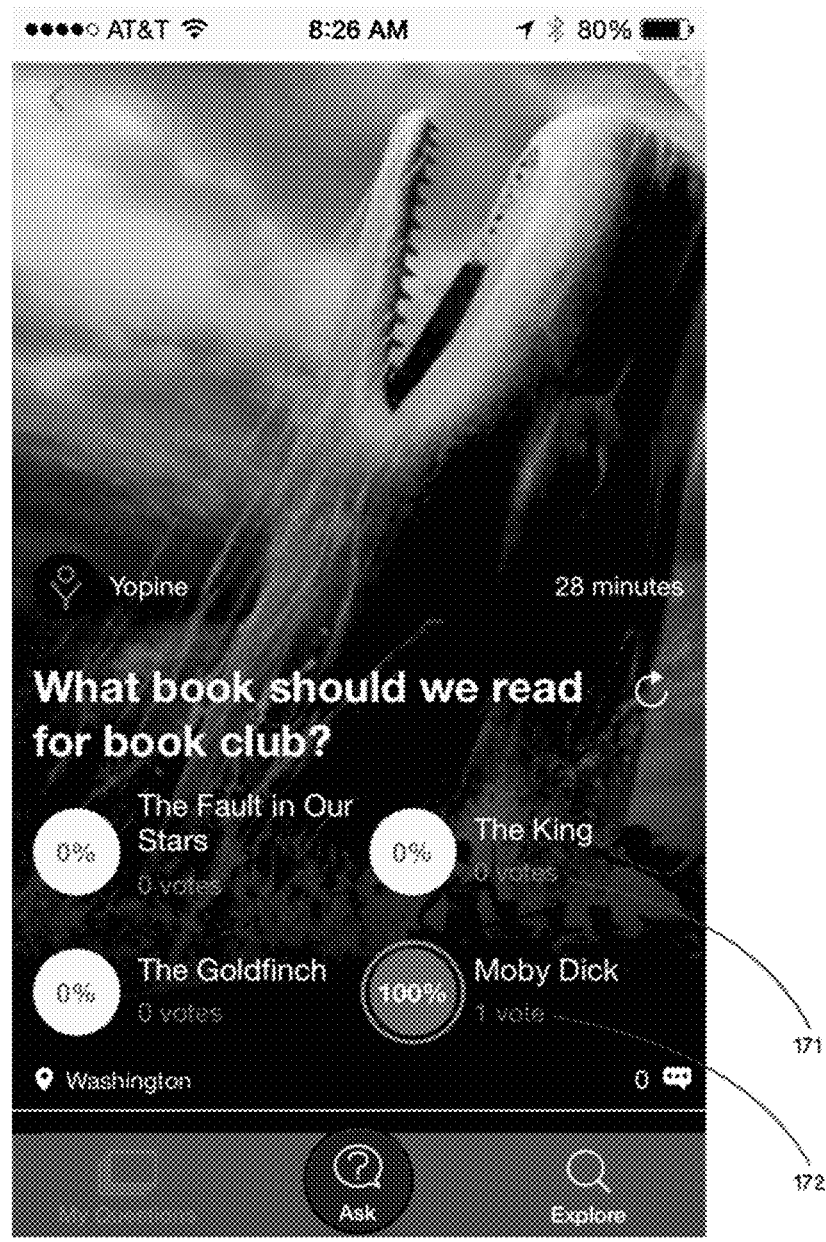

Upon the selecting (tapping) of selection 170, FIG. 4D is generated and provided thereby becoming the poll version of previously FIG. 4A incarnated brainstorm. The polls 171, 172 are now the poll version of selection 169.

Figure 5A:
FIG. 5 is a non-limiting, example diagram schematically illustrating the home screen and navigation to other modules and functionalities of the present disclosure and illustration of polling via cross-sources (Facebook, Twitter, phone contacts) that includes FIGS. 5A through 5K illustrating example screenshots of polling via cross-sources in accordance with an example embodiment of the present disclosure.
Figure 5B:
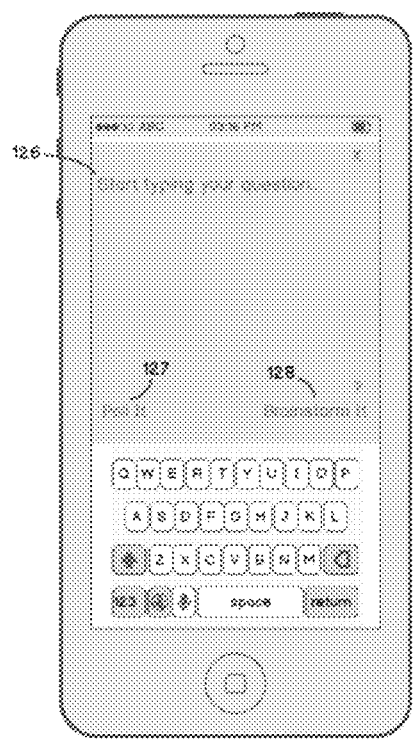

FIG. 5—Group polling via cross contact sources (Social Media contacts [e.g., Facebook, Twitter], phone contacts)— FIG. 5A illustrates the home screen of the polling and brainstorming application in accordance with the present disclosure for providing central navigation to features of the application as well as provides the logical starting point of the 'Ask' GUI 122. The 'Ask' GUI can be tapped to cause display of display illustrated in FIG. 5B. The lower portion of the screen of on FIG. 5A containing GUIs 123, 124, 125 is known as the 'tray'. As described above, GUI 123 is the direct link to FIG. 5I known colloquially as 'My Questions'. GUI 124 takes the user back to the main 'Ask' GUI 122 location should the user navigate away. The GUI 125 is the direct link to FIG. 5J known as the 'Explore' screen. FIG. 5B illustrates the display where the user arrives having tapped the 'Ask' GUI 122. GUI 126 is the area where the user is enabled to ask any question they wish. GUI 127 takes the user to FIG. 5D where they may construct the poll version of content for the present disclosure. GUI 128 will take the user to FIG. 5C where they may construct the brainstorm version of content for the present disclosure.

Figure 5C:
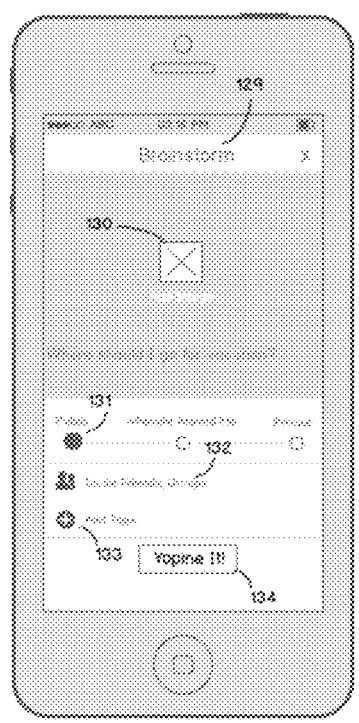
Figure 5D:
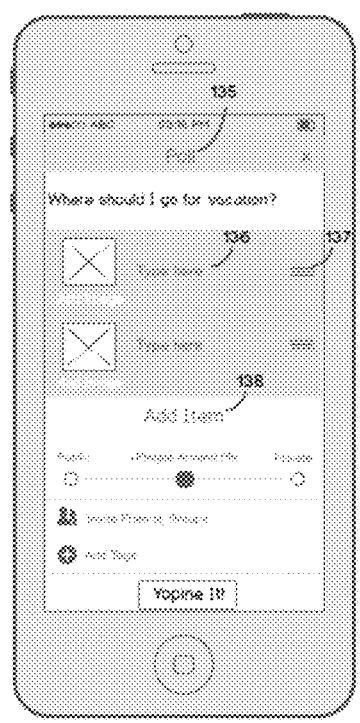

FIG. 5C illustrates GUI 129 as represented as a brainstorm construction screen. GUI 129 is defined as an open question that elicits free form open answers 153 as contributions or responses to the question at hand. GUI 130 enables the user to choose an image to accompany the question. The GUI 130 image options are as follows: search engine searched image based on any terms or words; social media (e.g., Instagram) searched image; photo taken by the device's camera; image saved in the device's photo albums. The GUI 131 is the default audience of 'Public'. The GUI 132 when chosen makes the brainstorm/poll visible and available to any user as seen in FIG. 5J 'Explore'. GUI 132 takes the user to FIG. 5G known as "Invite Friends, Groups'. GUI 133 takes user to FIG. 5H known as "#Tags". GUI 134 executes a constructed brainstorm or poll and causes transmission of the content to the intended recipients. FIG. 5D is the poll GUI 135 for constructing polling events/content. A poll GUI 135 is defined as an open question accompanied by pre-defined options 136 as choices-as-answers to the question at hand.

Figure 5E:
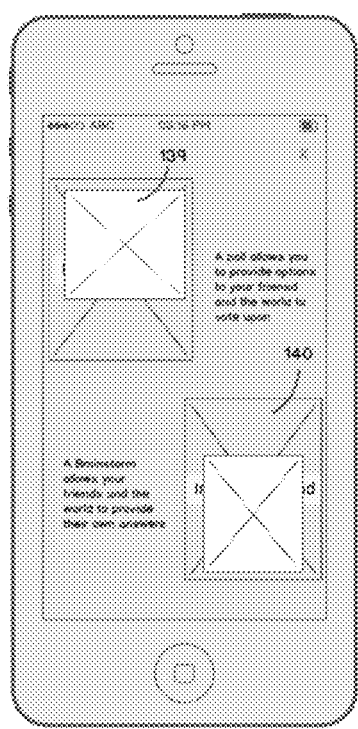
Figure 5F:
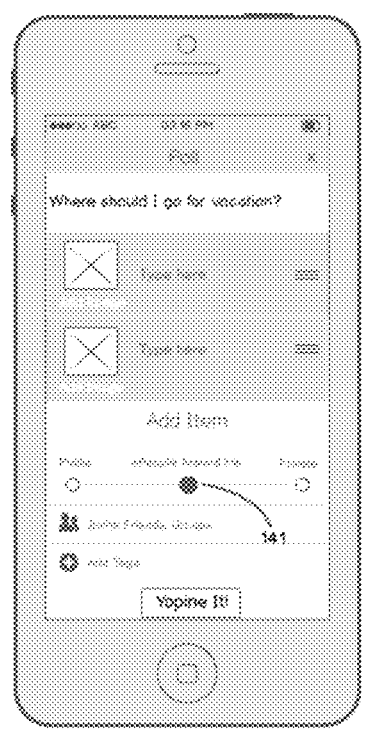

FIG. 5E is a help feature that, when invoked, provides a brief yet illustrative description of the 2 types of content in the present disclosure. The poll 139 defines a poll in the context of the present disclosure. The brainstorm 140 defines a brainstorm in the context of the present disclosure.

Figure 5I:
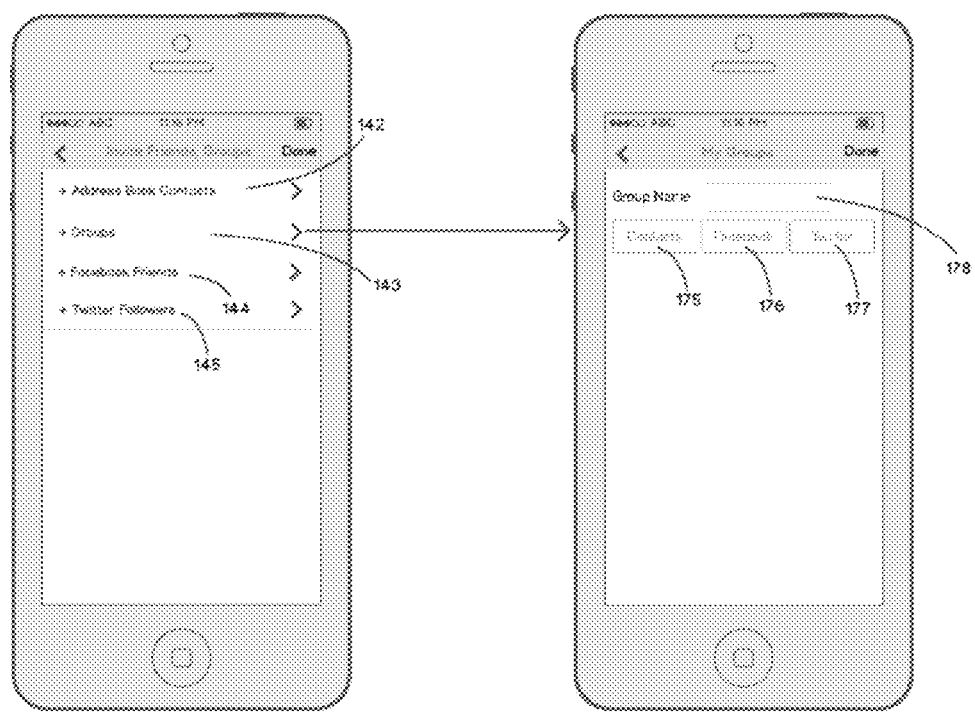
Figure 5J:
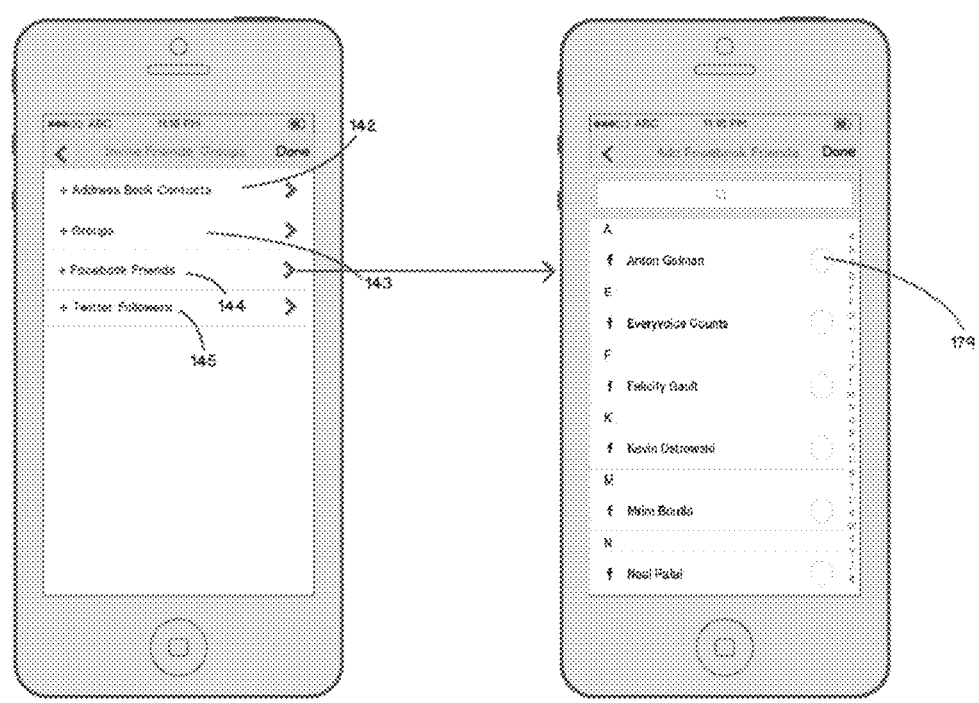
Figure 5K:
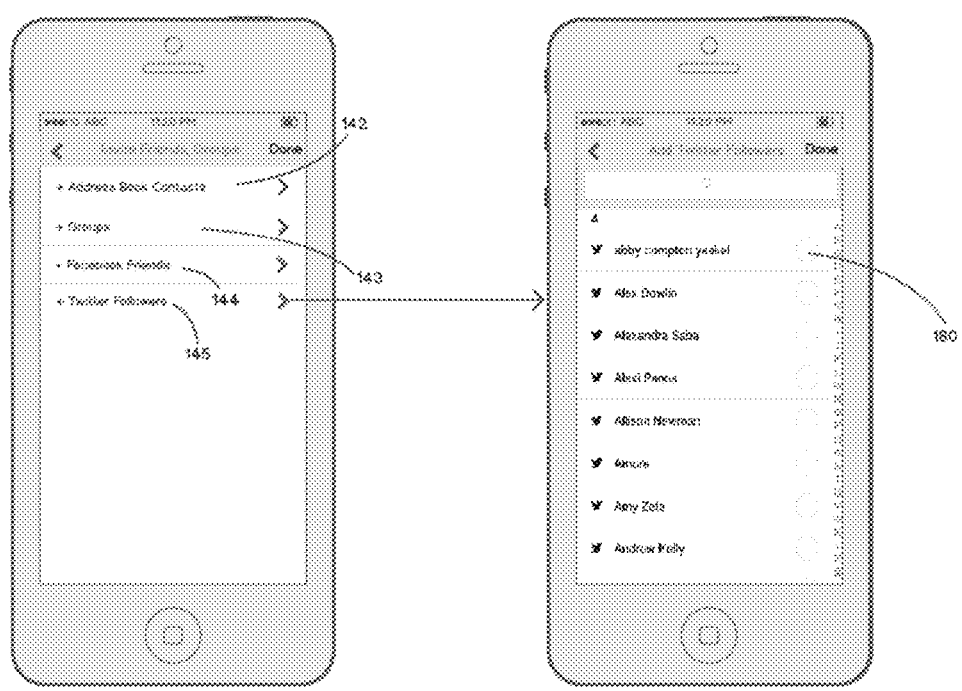

FIG. 5G is the illustrates an embodiment of the present disclosure [Group polling via cross contact sources (groups and/or individuals associated through Social Media [e.g., Facebook, Twitter, LinkedIn, etc.], phone contacts)]. This also manages the way(s) to invite others to participate in created content that is not proximally aware such as described above. GUI 142 calls FIG. 5H of the client device 107 onboard contact list or address book. The client device's 107 OEM technologies can access the contact list where the user may select GUI 174 to select desired contacts to receive the content. GUI 143 calls FIG. 5I of the 107 'My Groups'. Upon accessing the client device 107, FIG. 5I illustrates that the user may create a group name 178 utilizing any string of characters. Once the client device 107 has done this they may now tap GUI 175 contact to add any amount of contact names 174 from the on-board contact list; tap GUI 176 to add any amount of 179 Facebook friends; tap GUI 177 to add any amount of 180 Twitter followers. Once the group name 178 is created it can be chosen at any time in the future with all members automatically invited intact. GUI 144 calls FIG. 5J of the client device 107 add 'Facebook Friends' to select from an integrated list of their actual Facebook friends. GUI 145 calls FIG. 5K of the client device 107 add 'Twitter Followers' to select from an integrated list of their actual Twitter followers. While the technology is described with respect to Facebook and Twitter platforms, it is understood that the present disclosure can be utilized in association with other suitable Social Media websites.

The present disclosure serves to create a single collective poll or brainstorm across three types of contacts in their native form. The present disclosure successfully polls groups of people different and independent contact sources (e.g., Facebook, Twitter, Phone Contacts). This is achieved through the client device's 107 simultaneous direct integration with all three contact sources then pulling them back into client device 107 for tally and display.

Figure 6A:
FIG. 6 is a non-limiting, example diagram schematically illustrating the home screen and navigation to other modules and functionalities of the present disclosure and illustration of Sponsored Keywords as defined by poll creators as a marketing tactic that includes FIGS. 6A through 6G illustrating example screenshots of providing functionality to create Sponsored Keywords as defined by poll creators in accordance with an example embodiment of the present disclosure.

FIG. 6—Sponsored keywords as defined by poll creators as a marketing tactic—FIG. 6A the home screen of the polling and brainstorming application in accordance with the present disclosure provides central navigation to all features of the application as well as provides the logical starting point of 'Ask' GUI 122. The 'Ask' GUI can be tapped and immediately taken to FIG. 6B. The lower portion of the screen of on FIG. 6A containing GUIs 123, 124, 125 is known as the 'tray'. The tray serves as the path to the other major feature of the application that will be described in full detail in subsequent sections. GUI 124 takes the user back to the main GUI 122 Ask location should they navigate away. GUI 125 is the direct link to FIG. 6G known as the 'Explore' screen. FIG. 6B is where the user arrives having tapped 'Ask' GUI.

GUI 126 is the area where the user is enabled to ask any question they wish. This is the first field where there may occur an instance of a sponsored keyword. A sponsored keyword is one that any marketer or anyone wishing to bring attention or notoriety to their product, service, business or brand my 'sponsor' or purchase ownership of any word. If that word is then used at random by GUI 127, the owner's product, service, business or brand will become either a brainstorm contribution or a poll option as the case may be. FIG. 6E where they may construct the poll version of content for the present disclosure illustrates the second area where a sponsored keyword may be added by any client device 107. GUI 181 is a poll option created by the client device 107 and unwittingly could pass a poll option that eventually matches a sponsored keyword.

Figure 6B:
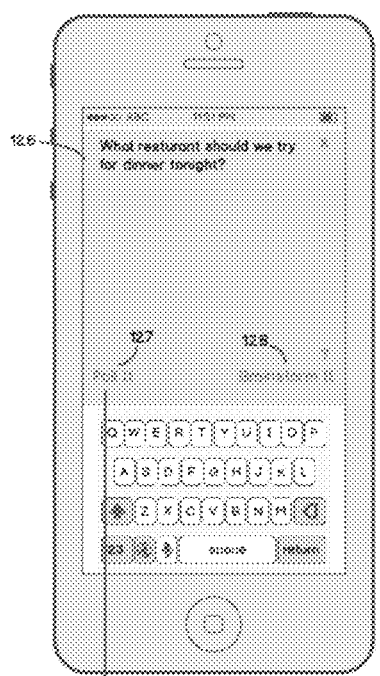
Figure 6E:
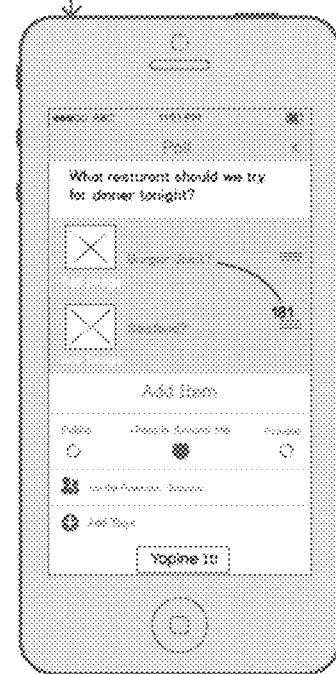
Figures 6F, 6G:
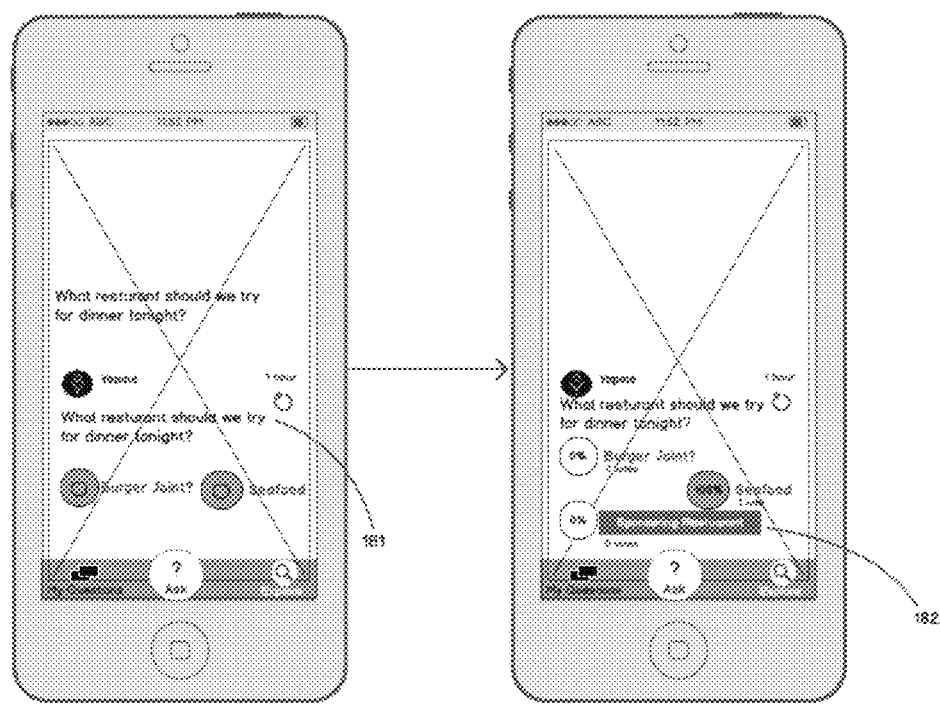

FIG. 6F is the GUI 181 illustration of potential sponsored keyword use in client 107 subsequent to the creation of the poll. FIG. 6G illustrates GUI 182 the highlighting of the poll option "Sponsoring Restaurant" who is the owner or sponsor of those keywords.

FIG. 6C represents GUI 126 FIG. 6B illustration of potential sponsored keyword use in the client device 107 subsequent to the creation of the brainstorm. The GUI 183 can provide contributions or responses to the question at hand. FIG. 6D 184 illustrates the highlighting of the brainstorm idea or contribution of "Sponsoring Restaurant" who is the owner or sponsor of those keywords.

Thus, a polling system can comprise a mobile electronic device (e.g., smartphone) application that generates content in the form of a poll or brainstorm wherein the content derives feedback and relevant data based on both subjects' (pollster and pollee) presence and proximity to existing Wi-Fi radio waves. The pollster can ask any question and cull responses in the form of votes, ideas or comments from the pollee simply due to common proximity to ambient Wi-Fi signals. The present disclosure is directed to a system and method for first pinning (client A pins to server), pairing (client B through N picks up or pairs with that content), collecting (server tallies, formats, treats) and then displaying content (present collected content & its associated views/votes/comments and shows to all clients in range).

A polling system can also comprise a mobile electronic device application that generates content in the form of a poll or brainstorm wherein the content derives feedback and relevant data based on both subjects' (pollster and pollee) presence and proximity to existing Global Positioning Systems (GPS). The pollster can ask any question and cull responses in the form of votes (poll), ideas (brainstorm) or comments from the pollee simply due to common proximity to existing Global Positioning Systems (GPS).

A polling system can also comprise a mobile electronic device application as described above wherein the pollster begins with the question version of brainstorm where an open question is asked; pollees supply ideas or contributions as answers; pollster may view and select the ideas/contributions that appeal to them; with one tap the current content type brainstorm is transformed into a poll.

A polling system can also comprise a mobile electronic device application as described wherein the pollster in seeking an audience for their content (poll or brainstorm) question can directly address pollees via on board phone contacts, direct access to their Facebook friends and direct access to their Twitter followers.

A polling system can also comprise a mobile electronic device application as described above wherein paying customers, advertisers, marketers, brands, businesses and individuals can become the temporary owner of keywords and, if in the process of asking a question the keyword is mentioned, the paying customers, advertisers, marketers, brands, businesses and individual's brand name becomes, in the case of a poll, a voting option and in the case of a brainstorm, an idea/contribution.

Generally, any of the functions described herein can be implemented using hardware (e.g., fixed logic circuitry such as integrated circuits), software, firmware, or a combination of these embodiments. Thus, the blocks discussed in the above disclosure generally represent hardware (e.g., fixed logic circuitry such as integrated circuits), software, firmware, or a combination thereof. In the instance of a hardware embodiment, for instance, the various blocks discussed in the above disclosure may be implemented as integrated circuits along with other functionality. Such integrated circuits may include all of the functions of a given block, system or circuit, or a portion of the functions of the block, system or circuit. Further, elements of the blocks, systems or circuits may be implemented across multiple integrated circuits. Such integrated circuits may comprise various integrated circuits including, but not necessarily limited to: a monolithic integrated circuit, a flip chip integrated circuit, a multichip module integrated circuit, and/or a mixed signal integrated circuit. In the instance of a software embodiment, for instance, the various blocks discussed in the above disclosure represent executable instructions (e.g., program code) that perform specified tasks when executed on a processor. These executable instructions can be stored in one or more tangible computer readable media. In some such instances, the entire system, block or circuit may be implemented using its software or firmware equivalent. In other instances, one part of a given system, block or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A computer-readable memory containing instructions for causing a computing device to perform operations, the operations comprising:
   receiving, at a server, a request to pair at least one of a poll inquiry, gauge inquiry, brainstorm inquiry, or survey inquiry with a wireless network device from a first client device associated with a first account in communication with the wireless network device, the request to pair the poll inquiry based upon a local area wireless signal emitted from the wireless network device, wherein the first client device ranks one or more local area wireless signals based upon signal strength and transmits the polling inquiry via the wireless network device based upon the ranking and a wireless signal selection;
   pairing, at the server, the polling inquiry with the wireless network device;
   determining whether a second client device associated with a second account has established a communication link with the wireless network device via the local area wireless signal;
   automatically transmitting the at least one of the poll inquiry, gauge inquiry, brainstorm inquiry, or survey inquiry to the second client device after determining that the second client device established the communication link; and
   receiving a free-form reply, at the server, pertaining to the at least one of the poll inquiry, gauge inquiry, brainstorm inquiry, or survey inquiry from the second client device, the free-form reply including answers to the at least one of the poll inquiry, gauge inquiry, brainstorm inquiry, or survey inquiry.

2. The computer-readable memory as recited in claim 1, wherein the pairing the at least one of the poll inquiry, gauge inquiry, brainstorm inquiry, or survey inquiry further comprises pairing the at least one of the poll inquiry, gauge inquiry, brainstorm inquiry, or survey inquiry with the local area wireless signal based upon a media access control (MAC) address of a wireless network device that emits the local area wireless signal.

3. The computer-readable memory as recited in claim 1, wherein the server comprises a cloud-based delivery server.

4. The computer-readable memory as recited in claim 1, wherein the pairing the at least one of the poll inquiry, gauge inquiry, brainstorm inquiry, or survey inquiry further comprises pairing, via a wireless registry, the at least one of the poll inquiry, gauge inquiry, brainstorm inquiry, or survey inquiry with the local area wireless signal based upon a media access control (MAC) address of a wireless network device that emits the local area wireless signal.

5. A system comprising:
   a first client device including:
      a memory configured to store one or more modules;
      a processor configured to execute the one or more modules to cause the processor to:
         rank one or more local area wireless signals based upon signal strength;
         transmit a polling inquiry via a wireless network device based upon the ranking and a wireless signal selection;
   the wireless network device configured to emit at least one local area wireless signal;
   a server in electronic communication with the first client device via the wireless network device, the server comprising:
   a memory for storing one or more modules;
   a processor for executing the one or more modules to cause the processor to:
      receive the polling inquiry and the wireless signal selection from the first client device associated with a first account;
      pair the polling inquiry with the wireless network device based upon the ranking and the wireless signal selection;
      determine whether a second client device associated with a second account has established a communication link with the wireless network device via the local area wireless signal corresponding to the wireless signal selection; and
      automatically transmit the polling inquiry to the second client device after determining the second client device established the communication link; and
      receive a free-form reply pertaining to the poll inquiry from the second client device, the free-form reply including answers to the poll inquiry.

6. The system as recited in claim 5, wherein the polling inquiry is paired with the at least one local area wireless signal based upon a media access control (MAC) address of the wireless network device.

7. The system as recited in claim 5, wherein the server comprises a cloud-based delivery server.

8. The system as recited in claim 5, further comprising a wireless registry in electronic communication with the server, the wireless registry configured to pair the polling inquiry with the local area wireless signal based upon a media access control (MAC) address of a wireless network device that emits the at least one local area wireless signal.

9. A method comprising:
receiving, at a server, a request to pair a poll inquiry with a wireless network device from a first client device associated with a first account in communication with the wireless network device, the request to pair the poll inquiry based upon a local area wireless signal emitted from the wireless network device, wherein the first client device ranks one or more local area wireless signals based upon signal strength and transmits the polling inquiry via the wireless network device based upon the ranking and a wireless signal selection;
pairing, at the server, polling inquiry with the wireless network device;
determining whether a second client device associated with a second account has established a communication link with the wireless network device via the local area wireless signal;
automatically transmitting the polling inquiry to the second client device when the second client device after determining that the second client device established the communication link; and
receiving a free-form reply, at the server, pertaining to the poll inquiry from the second client device, the free-form reply including answers to the poll inquiry.

10. The method as recited in claim 9, wherein the pairing the polling inquiry further comprises pairing the polling inquiry with the local area wireless signal based upon a media access control (MAC) address of the wireless network device.

11. The method as recited in claim 9, wherein the pairing the polling inquiry further comprises pairing, via a wireless registry, the polling inquiry with the local area wireless signal based upon a media access control (MAC) address of the wireless network device.

* * * * *